(12) United States Patent
Fischel

(10) Patent No.: US 10,522,856 B2
(45) Date of Patent: Dec. 31, 2019

(54) ELECTROCHEMICAL CELLS WITH MOBILE ELECTROLYTE

(71) Applicant: Halbert P. Fischel, Las Vegas, NV (US)

(72) Inventor: Halbert P. Fischel, Las Vegas, NV (US)

(73) Assignee: Global Energy Science, LLC, Santa Barbara, CA (US)

( * ) Notice: Subject to any disclaimer, the term of this patent is extended or adjusted under 35 U.S.C. 154(b) by 180 days.

(21) Appl. No.: 15/408,940

(22) Filed: Jan. 18, 2017

(65) Prior Publication Data
US 2017/0125829 A1 May 4, 2017

Related U.S. Application Data

(60) Continuation-in-part of application No. 15/069,998, filed on Mar. 15, 2016, now Pat. No. 9,991,059, (Continued)

(51) Int. Cl.
  $H01M\ 4/66$ (2006.01)
  $H01M\ 4/74$ (2006.01)
  (Continued)

(52) U.S. Cl.
  CPC ........ *H01M 8/04283* (2013.01); *H01G 11/02* (2013.01); *H01G 11/04* (2013.01);
  (Continued)

(58) Field of Classification Search
  CPC . H01M 8/02–04291; H01M 8/08–086; H01M 8/18–184; H01M 8/24–2495;
  (Continued)

(56) References Cited

U.S. PATENT DOCUMENTS

| 3,490,952 A | 1/1970 | Balaguer |
| 3,930,094 A | 12/1975 | Sampson et al. |

(Continued)

FOREIGN PATENT DOCUMENTS

| CN | 102306800 A | 1/2012 |
| DE | 4207819 A1 | 9/1993 |

(Continued)

OTHER PUBLICATIONS

International Search Report dated Dec. 22, 2017 for patent application PCT/US2017/051739.
(Continued)

*Primary Examiner* — Jonathan G Leong
*Assistant Examiner* — Jacob Buchanan
(74) *Attorney, Agent, or Firm* — Bachman & LaPointe, P.C.

(57) ABSTRACT

An electrode comprising galvanic membranes having a thickness defined by an average length of vectors normal to a membrane first surface and extending to where said vectors intersect a membrane uncompressed second surface; a non-porous metal sheet having first and second surfaces; a non-porous dielectric sheet having first and second surfaces; square weave metal wire screens having a wire diameter slightly greater than one half the at least one galvanic membrane thickness dimension; wherein, at least one galvanic membrane is adjacent the metal wire screen on the at least one galvanic membrane first and second surfaces in a stack of membranes and screens; the metal wire screen is adjacent the first surface of the non-porous dielectric sheet; the second surfaces of non-porous metal sheets have a sustained pressure of at least 7 million Pascal; and; the metal wire screen is collectively in incompressible vertical alignment with another metal wire screen.

11 Claims, 10 Drawing Sheets

Related U.S. Application Data which is a division of application No. 14/717,139, filed on May 20, 2015, now Pat. No. 9,337,474.

(60) Provisional application No. 62/286,994, filed on Jan. 26, 2016, provisional application No. 62/086,836, filed on Dec. 3, 2014.

(51) Int. Cl.

| | | |
|---|---|---|
| *H01M 4/96* | (2006.01) | |
| *H01M 4/02* | (2006.01) | |
| *H01M 8/04* | (2016.01) | |
| *H01M 8/04276* | (2016.01) | |
| *H01M 8/00* | (2016.01) | |
| *H01G 11/24* | (2013.01) | |
| *H01G 11/02* | (2013.01) | |
| *H01G 11/04* | (2013.01) | |
| *H01G 11/36* | (2013.01) | |
| *H01G 11/70* | (2013.01) | |
| *H01M 4/133* | (2010.01) | |
| *H01M 4/04* | (2006.01) | |
| *H01M 10/04* | (2006.01) | |
| *H01G 11/46* | (2013.01) | |

(52) U.S. Cl.
CPC ............ *H01G 11/24* (2013.01); *H01G 11/36* (2013.01); *H01G 11/70* (2013.01); *H01M 4/02* (2013.01); *H01M 4/133* (2013.01); *H01M 4/661* (2013.01); *H01M 4/747* (2013.01); *H01M 4/96* (2013.01); *H01M 8/004* (2013.01); *H01G 11/46* (2013.01); *H01M 10/04* (2013.01); *Y02E 60/13* (2013.01)

(58) Field of Classification Search
CPC ... H01M 2/38–40; H01M 10/02–0587; H01M 4/02–049; H01M 4/24–30; H01M 4/62; H01M 4/624; H01M 4/64–80; H01M 4/86–8642; H01M 4/88–928
See application file for complete search history.

(56) References Cited

U.S. PATENT DOCUMENTS

| | | |
|---|---|---|
| 4,366,051 A | 12/1982 | Fischel |
| 4,386,987 A | 6/1983 | Covitch et al. |
| 5,034,135 A | 7/1991 | Fischel |
| 5,234,778 A | 8/1993 | Wright |
| 5,376,263 A | 12/1994 | Fischel |
| 5,955,215 A | 9/1999 | Kurzweil et al. |
| 6,099,987 A | 8/2000 | Daniel-Ivad et al. |
| 7,955,535 B2 | 6/2011 | Liang et al. |
| 7,964,301 B2 | 6/2011 | Fischel et al. |
| 7,971,489 B2 | 7/2011 | Pushparaj et al. |
| 7,972,747 B2 | 7/2011 | Fischel |
| 8,017,261 B2 | 9/2011 | Halbert |
| 8,021,747 B2 | 9/2011 | Yi et al. |
| 8,124,296 B1 | 2/2012 | Fischel |
| 8,147,767 B2 | 4/2012 | Fischel |
| 8,158,277 B1 | 4/2012 | Fischel |
| 8,173,217 B2 | 5/2012 | Shin et al. |
| 8,187,560 B2 | 5/2012 | Fischel |
| 8,187,737 B2 | 5/2012 | Fischel |
| 8,213,157 B2 | 7/2012 | Wei et al. |
| 8,283,062 B2 | 10/2012 | Fischel |
| 8,283,275 B2 | 10/2012 | Heo et al. |
| 8,333,810 B1 | 12/2012 | Meyyappan |
| 8,394,518 B2 | 3/2013 | Fischel et al. |
| 8,415,012 B2 | 4/2013 | Zheng et al. |
| 8,703,355 B2 | 4/2014 | Zhang et al. |
| 8,911,893 B2 | 12/2014 | Suppes |
| 8,951,697 B2 | 2/2015 | Zhang et al. |
| 9,337,474 B1* | 5/2016 | Fischel .................. H01G 11/24 |
| 9,508,976 B2 | 11/2016 | Herle |
| 9,698,396 B2 | 7/2017 | Lee et al. |
| 2002/0097549 A1 | 7/2002 | Maletin et al. |
| 2002/0180094 A1 | 12/2002 | Gough et al. |
| 2004/0058249 A1 | 3/2004 | Cai et al. |
| 2005/0079409 A1* | 4/2005 | Andelman .......... C02F 1/46109 |
| | | 429/94 |
| 2005/0104243 A1 | 5/2005 | Mercuri et al. |
| 2006/0172134 A1 | 8/2006 | Ro et al. |
| 2007/0048594 A1 | 3/2007 | Oh et al. |
| 2007/0148531 A1 | 6/2007 | Yoshizawa et al. |
| 2008/0241685 A1 | 10/2008 | Hinoki et al. |
| 2008/0268336 A1* | 10/2008 | Jeon .................... H01M 2/0225 |
| | | 429/182 |
| 2009/0136832 A1 | 5/2009 | Mitsuda et al. |
| 2010/0086837 A1* | 4/2010 | Asari .................... H01G 9/0029 |
| | | 429/94 |
| 2010/0119932 A1 | 5/2010 | Nakura et al. |
| 2010/0178543 A1 | 7/2010 | Gruner et al. |
| 2011/0123866 A1 | 5/2011 | Pan et al. |
| 2012/0193242 A1 | 8/2012 | Marchal |
| 2013/0017432 A1 | 1/2013 | Roumi |
| 2013/0045413 A1 | 2/2013 | Wang et al. |
| 2014/0317920 A1 | 10/2014 | Vanderleeden et al. |
| 2015/0104714 A1* | 4/2015 | Galande ................ H01M 4/13 |
| | | 429/233 |
| 2016/0204408 A1 | 7/2016 | Herle |
| 2016/0240326 A1 | 8/2016 | Fischel |
| 2017/0047591 A1 | 2/2017 | Fischel |
| 2017/0062787 A1 | 3/2017 | Fischel |
| 2017/0125829 A1 | 5/2017 | Fischel |
| 2017/0173728 A1 | 6/2017 | Fischel |

FOREIGN PATENT DOCUMENTS

| | | |
|---|---|---|
| JP | 2015524991 A | 8/2015 |
| KR | 20140048197 A | 4/2014 |
| WO | 2007039726 A1 | 4/2007 |
| WO | 2011137239 A1 | 11/2011 |

OTHER PUBLICATIONS

International Search Report dated Feb. 22, 2018 for patent application PCT/US2017/060278.
Goodenough, J. et al., "The Li-Ion Rechargeable Battery: A Perspective", Journal of the American Chemical Society, 2013, 135 (4), pp. 1167-1176.
Gaberscek M. et al, "The Importance of Interphase Contacts in Li Ion Electrodes: The Meaning of the High-Frequency Impedance Arc", Electrochemical and Solid-State Letters,(2008), vol. 11, pp. A170-A174.
Muenzel, V. et al., "A Comparative Testing study of Commercial 18650—Format Lithium-Ion Battery Cells", Journal. ECS, (2015), vol. 162, (8) A1592-A1600.
Laurencelle, F. et al, "Characterization of a Ballard MK5-E Proton Exchange Membrane Fuel Cell Stack", Fuel Cells, 1(1) , 2001, pp. 66-71.
Kim, J., Lee S-M., Srinivasan S. and Chamberlin C.E., (1995), "Modeling of Proton Exchange Membrane Fuel Cell Performance with an Empirical Equation", Journal of the Electrochemical Society, vol. 142(8), pp. 2670-2674.
Koper, M., Ed., Fuel Cell Catalysis, Wiley (2009), Chapter 3, p. 70.
Newman, J., et al., "Electrochemical Systems" Wiley (2004), Chapter 22 and Table 11.1, p. 284.
Bagotsky, V.S., "Fundamentals of Electrochemistry", Wiley (2006), Chapter 4.4, pp. 60-61.
Conway, B.E, "Electrochemical Supercapacitors", Plenum (1999), Chapters 16, 17.
Gordon, M. and Suppes, G., "Convection Battery-Modeling, Insight, and Review", AIChE Journal, Aug. 18, 2013, vol. 59, No. 8, pp. 2833-2843.
Sassin, M. B. et al., "Redox Deposition of Nanoscale Metal Oxides on Carbon for Next-Generation Electrochemical Capacitors", Accounts of Chemical Research (2013), vol. 46, No. 5, pp. 1062-1074.

(56) References Cited

OTHER PUBLICATIONS

Chung, H. T., et al., "Active and Stable Carbon Nanotube/Nanoparticle Composite Electrocatalyst for Oxygen Reduction", Nature Communications, May 28, 2013.

Gorlin, Y., and Jaramillo, T.F., A Bifunctional Nonprecious Metal Catalyst for Oxygen Reduction and Water Oxidation, JACS Communications, Sep. 14, 2010.

Wang, H., et al., "An Ultrafast Nickel-Iron Battery from Strongly Coupled Inorganic Nanoparticle/Nanocarbon Hybrid Materials", Nature Communications, Jun. 26, 2012.

Zou, X. et al., "Cobalt Embedded Nitrogen-Rich Nanotubes Efficiently Catalyze Hydrogen Evolution Reaction at All pH Values**" Angewandte Chemie, (2014), 126, pp. 4461-4465.and Supporting Information.

Ma, X., et al., High Rate Micrometer Ordered $LiNi_{0.5}Mn_{1.5}O_4$, Journal of the Electrochemical Society (2010), 157(8), pp. A925-A931.

Bockris, J, O. et al, Modem Electrochemistry, 2nd Edition, Kluwer Academic/Plenum, Chapter 13.5, pp. 1812-1813. (2000).

Evanoff, K. et al., "Ultra Strong Silicon-Coated Carbon Nanotube Nonwoven Fabric as a Multifunctional Lithium-Ion Battery Anode", American Chemical Society Oct. 17, 2012, vol. 6, No. 11, pp. 9837-9845.

International Search Report dated May 24, 2018 for patent application PCT/US2017/066558.

\* cited by examiner

ELECTROCHEMICAL CELLS WITH MOBILE ELECTROLYTE

CROSS-REFERENCE TO RELATED APPLICATIONS

Benefit is claimed of U.S. Patent Application No. 62/286,994, filed Jan. 26, 2016, the disclosure of which is incorporated by reference herein in its entirety as if set forth at length and this is a Continuation-In-Part of U.S. application Ser. No. 15/069,998, filed Mar. 15, 2016, which is a divisional of U.S. application Ser. No. 14/717,139, filed May 20, 2015, now U.S. Pat. No. 9,337,474, which claims the benefit of U.S. Patent Application No. 62/086,836, filed Dec. 3, 2014, and which is also incorporated herein by reference.

BACKGROUND

The present inventor, Halbert Fischel, has been researching and developing efficient utilization of materials and processes using mechanical engineering, electrical engineering, electrochemistry and fluidics. His early work included use of advanced fluidics in association with rotating microporous membranes for use in diverse fields, including for example "blood fractionation systems", and "hemodialysis systems", as disclosed respectively in U.S. Pat. No. 5,034,135 of 23 Jul. 1991, U.S. Pat. No. 5,376,263 of 27 Dec. 1994, and U.S. Pat. No. 4,366,051 of 28 Dec. 1982. More recently the inventor has been focusing upon advanced fluidics integrated with electrochemical cells, resulting in a series of ten issued patents, so far. Each of those ten patents is associated with a "Case" letter (identified below), and each is incorporated herein by reference thereto. This Non-Provisional application, identified as Case M, is therefore related to the following patents and patent application of the present inventor, Halbert P. Fischel.

Case A: "Electrochemical Cells Utilizing Taylor Vortex Flows", application Ser. No. 12/800,658 of 20 May 2010, now U.S. Pat. No. 8,017,261 of 13 Sep. 2011.

Case AI: "Electrochemical Cells Utilizing Taylor Vortex Flows", application Ser. No. 13/194,049 of 29 Jul. 2011, now U.S. Pat. No. 8,283,062 of 9 Oct. 2012, which is a division of application Ser. No. 12/800,658 (Case A): now U.S. Pat. No. 8,017,261 of 13 Sep. 2011.

Case A2: "Galvanic Electrochemical Cells Utilizing Taylor Vortex Flows", application Ser. No. 13/235,480 of 18 Sep. 2011, now U.S. Pat. No. 8,187,737 of 29 May 2012, which is a continuation-in-part of application Ser. No. 13/194,049 (Case A1), now U.S. Pat. No. 8,283,062.

Case B: "Fuel Reformers Utilizing Taylor Vortex Flows", application Ser. No. 12/800,710 of 20 May 2010, now U.S. Pat. No. 8,187,560 of 29 May 2012.

Case C: "Chemical Process Accelerator Systems Comprising Taylor Vortex Flows", application Ser. No. 12/800,657 of 20 May 2010, now U.S. Pat. No. 8,147,767 of 3 Apr. 2012.

Case D: "Direct Reaction Fuel Cells Utilizing Taylor Vortex Flows", application Ser. No. 12/800,672 of 20 May 2010, now U.S. Pat. No. 7,972,747 of 5 Jul. 2011.

Case E: "Dynamic Accelerated Reaction Batteries", application Ser. No. 12/800,709 of 20 May 2010 with additional inventors Philip Michael Lubin and Daniel Timothy Lubin, now U.S. Pat. No. 7,964,301 of 21 Jun. 2011.

Case F1: "Cross-Flow Electrochemical Batteries", application Ser. No. 13/171,080 of 28 Jun. 2011, now U.S. Pat. No. 8,158,277 of 17 Apr. 2012, claiming benefit of U.S. Provisional Patent Application No. 61/388,359 filed 30 Sep. 2010, and of International Patent Application No. PCT/US 10/39885 filed 25 Jun. 2010.

Case G: "Thick Electrode Direct Reaction Fuel Cells Utilizing Cross Flows and Taylor Vortex Flows", application Ser. No. 13/174,686 of 30 Jun. 2011, now U.S. Pat. No. 8,124,296 of 28 Feb. 2012, claiming benefit of U.S. Provisional Patent Application No. 61/388,359 filed 30 Sep. 2010.

Case H: "Galvanic Electrochemical Cells for Generating Alternating Current Electricity", with inventor Sheldon Epstein, application Ser. No. 13/437,771, now U.S. Pat. No. 8,394,518 of 12 Mar. 2013.

Case L: "Electrodes for Electrochemical Cells", U.S. Pat. No. 9,337,474, of which the present application is a continuation-in-part application thereof.

Case O: "Ultralow Resistance Electrodes For Electrochemical Cells" Ser. No. 15/274,476 filed 23 Sep. 2016, of which the present application is a continuation-in-part of U.S. Pat. No. 9,337,474 having U.S. patent application Ser. No. 14/717,139.

Case M: "Electrochemical Cells With Convection," Ser. No. 62/286,994 filed Jan. 26, 2016.

The above patents are incorporated herein by reference thereto.

This invention relates to galvanic electrochemical cells that produce direct current electricity from stored energy in cells that employ mobile electrolyte. Rechargeable (secondary) and air/oxygen breathing convection batteries and fuel cells are disclosed examples.

($\Omega$-$cm^2$ is resistance, R of 1 square centimeter of electrode area in ohms. $\mu m$ is micron)

Mobile electrolyte is not commonly employed in secondary batteries and fuel cells although examples can be found in the patent and scientific literature. Theoretically, electrolyte flow can move ions from one electrode to the other much faster than diffusion. Such ion exchange between polar opposite electrodes is fundamental in electrochemical cells that produce direct current electricity from stored energy. That ion exchange rate limits electrical current. Redox chemical reaction rate at the faradaic solid surface interface with electrolyte is another electrical current density limitation. Mobile electrolyte convection greatly speeds both aspects of ion kinetics. It was used in Apollo Mission fuel cells and replaced by less efficient solid state and porous matrix electrolyte versions because multiple series connected mobile electrolyte cells yield high voltage but discharged through electrolyte circulation pathways.

Batteries suited for common use do not employ convection because electrode permeating electrolyte washes out unstable electrode materials which also offer too much resistance to liquid flow. U.S. Pat. No. 8,911,893 B2 to Suppes provides an example of a packed bed electrode permeated by electrolyte providing unit cell voltage. Compression of the cell is applied to keep active particles and conducting additive (carbon black) immobilized and to somewhat improve electrical conduction. Volume energy storage capacity is not higher than common standard paste applications and there is no suitable provision for multiple cell series-connected electrolyte circulation. When multiple cells are wired in series, each cell requires its own circulation pump or similar discharge through electrolyte circulation pathways will occur as described for Apollo Mission fuel cells. That was the principal reason for the historic move to fixed electrolyte.

Battery electrode/electrolyte architecture employs a 2-phase liquid/solid relationship between active solid faradaic (electronegative anodic and less electronegative or electropositive cathodic) surfaces and attached liquid (dissociated ionic) electrolyte. Energy storage is a function of the mass of faradaic material having surface exposed to electrolyte and capable of redox valence change. Energy storage being the principal function of the battery, electrode and associated battery architecture must optimize faradaic material volume fraction. That said, energy can only be extracted if electrical current flows to the battery terminals. Prior art packs faradaic material in carbon black powder which serves as the conductor carrying electricity to metal. Application of combined carbon and active faradaics is limited to low concentration of carbon and thin layers on metal surfaces because of high (10 $\Omega$-cm$^2$) electrical resistance in the applied electrode layer. The high resistance, consequent limitation of thin layer energy storage and low area specific current density is compensated by large surface area to produce acceptable net current (ampere-hour Ah) rating known as C-rating. What is less widely appreciated is that area specific current density, i (A/cm$^2$) controls recharge interval.

It is an electrochemical given that electrode current density controls time to recharge the stored energy on an electrode surface defined by the active faradaic mass per unit area of electrode. It is also understood that electrode current density is limited because electrode resistance produces a voltage decrement given by iR and i$^2$R heating is a further serious issue. One fundamental purpose of this invention is to show how to significantly reduce R and to do it without compromising area specific energy density. It is a further purpose to provide mobile electrolyte between electrodes to support the higher electrical current with concomitantly high ion current required in any battery to balance electrical current. It is a further purpose to provide novel, unprecedented electrolyte circulation architecture for multiple series connected cells for high voltage that will prevent discharge through electrolyte circulation pathways.

All fuel cells fundamentally involve convection as the only way to bring fuel and oxygen to the 3-phase liquid/solid/gas redox reaction required on the surface of solid catalyst even as in most cases, electrolyte is not liquid. Many fuels are in liquid form and reaction products invariably carry water steam. Solid electrolytes, e.g. ionomeric polymers require low temperature and noble metal catalyst. Solid oxide electrolyte operates at the other end of the temperature scale and remains problematical as to size and cost. Both react at a triple-phase conductor/ion/gas boundary. Molten carbonate and many alkali electrolytes function effectively at intermediate temperature using inexpensive catalyst as effectively as noble metals. While electrode resistance remains an issue in all these examples, energy is stored in fuel and air so prior art has increased the ratio of electron conducting structure to catalyst mass in most cases. Specific electrode area resistance has reached $\approx$½ $\Omega$-cm$^2$ with current density $\approx$¼ to ½ A/cm$^2$. Most fuel cell chemistry is based upon oxidizing H$_2$ whether as such or extracted from hydrocarbon fuel. Consequently, $\approx$1 volt is all that can be produced. ½ ohm times ½ amp is ¼ volt or a 25% decrement in output voltage. It is also a ⅛ watt/cm$^2$ heat load or ⅓$^{rd}$ of the power for a cell delivering only ⅜ watt/cm$^2$.

It is physically possible to greatly increase catalyst concentration by volume compared to present electrode formulations. That would increase exchange current density, i$_o$ with less voltage decrement, $\eta$ in accordance with the Butler-Volmer equation, $\eta \approx k \ln(i/i_o)$ where k is a proportionality factor. This is not done in prior art because the voltage decrement iR would defeat the purpose. The usual noble metal catalyst volumetric proportion is less than 1%.

It can easily be increased by more than two orders of magnitude whereas Pt has been reduced from 28 to 0.2 mg/cm$^2$ of electrode area in common practice since electrode current density, <100 mA/cm$^2$ remains so low. R in this invention is reduced by several orders of magnitude by making electrodes in accordance with U.S. Pat. No. 9,337,474 et seq. and incorporating convection to accelerate inter-electrode ion exchange. Thus, i$_o$ is increased in proportion to increased catalyst mass density and it follows that i is as well.

Inter-electrode electrolyte convection is no longer found in prior art fuel cell technology. The present inventor has incorporated Taylor Vortex Flow (TVF) in since issued patents listed hereinabove and incorporated herein by reference. This invention makes electrodes porous and freely permeable to electrolyte so that a single circulation flow path becomes possible through both electrodes and the gap that separates them, now for the first time in fuel cell architecture. It is done in such a novel way that many cells can be electrically connected in series for high voltage using a single electrolyte circulation path and pump.

The desired purpose of the fuel cell is to be able to increase power density in proportion to fuel supply rate. In prior art PEMFC, even if all factors referred to above are mitigated, there remains the ion selective electrode separating membrane e.g. (Nafion™) having an order of magnitude more cation permeability in the plane of the membrane than through it where it is actually needed. It does more than prevent inter electrode convection. It also limits cell temperature to 60° C. At higher operating temperature it tends to degrade more rapidly which accounts for the noble metal catalyst requirement. Eliminating a membrane entirely in favor of a freely permeable filter or nothing at all to impede inter electrode ion exchange convection will greatly enhance power density. More cost effective catalyst can operate at 300 or more ° C. with nearly the same or better activation as the noble metals. High temperature will also enable direct oxidation of most hydrocarbon fuels for better energy conversion efficiency than presently possible with low temperature fuel cells.

Electrodes commonly used in electrochemical cells, e.g. battery and fuel cell, etc. cannot be used in this invention, either at all or without significant modification. All share the same defect namely, too much electrical resistance. Pastes impose ½ $\Omega$-cm$^2$ on fuel cell and 10 $\Omega$-cm$^2$ on secondary battery current flow; little improved by conduction additives and binders. Emerging technology has used carbon nanotubes (single wall, SWCNT and multiwall, MWCNT, collectively referred to here as CNT) and some other forms of graphene, e.g. sheets attached as deposits on metal or precipitated as nonwoven cohesive mats, i.e. pellicles. Prior art has not succeeded in attaching any of these materials to metal electrodes with less resistance than ½ $\Omega$-cm$^2$; the main source being contact resistance between CNT material and the metal surface, Asari[24]. Carbon structures attached as deposits on metal tend to peel off when exposed to charge/discharge cycles in fixed electrolyte; which testifies to their feeble electrical connection even when 'attached'. One can imagine what would happen when electrolyte flows on or through the material. Gold coatings were used by Nano-Lab, www.nano-lab.com/buckypaper to improve electrical contact of cohesive non-woven CNT with metal but reported 0.1 $\Omega$-cm$^2$, nevertheless.

Convection electrodes have been reported, Suppes, using packed beds of faradaic particles under 1,000 kPa compression. In order for concentrated electrochemical activity to occur the particles must be very small, e.g. nanoscale or at least of micron dimension. That leaves pathways too narrow and tortuous for achieving practical electrolyte permeability. Suppes reports much less than 1 Darcy with very little alternative to improve on that value. A reasonable channel pathway flow cross-section area would have to be $\geq 25 \ \mu m^2$ in order to achieve at least 2 Darcy permeability for 1 centipoise (cp) electrolyte. Electrodes of this invention achieve $\geq 20$ Darcy permeability and electrical resistance $<10^{-3} \ \Omega\text{-cm}^2$.

Furthermore, novel architecture is introduced to eliminate voltage loss in series connected mobile electrolyte cells due to reverse electro-motive force, emf imposed by electrolyte circulation pathways used in banks of prior art unit cells. A unit cell is defined as comprising a single anode-cathode pair producing unit cell voltage which is generally too low to be useful, especially in high power applications. Mobile electrolyte can greatly accelerate ion mobility and kinetics in secondary batteries for faster charge and discharge cycling but is rarely seen in prior art. Mobile electrolyte is not used in capacitors because ions barely move away from the surfaces where they are created but is an essential feature, even in putatively solid state fuel cells to deliver oxygen and fuels and remove reaction products. Mobile electrolyte is fundamental to the way flow batteries operate and water electrolysis relies on mobile electrolyte to add water and remove separated gases.

The problem with prior art electrolyte circulation was evident in mobile electrolyte fuel cells used in the Apollo lunar lander. Multiple series connected fuel cells needed separate pumps and circulation loops to prevent, e.g. high voltage anodes from communicating with low voltage cathodes through an electrolyte path where a back emf circuit is closed through the load. This invention solves the problem for the first time with unique series connected electrode architecture wherein anodes are indirectly exposed to one common electrolyte pool and cathodes to a separate common electrolyte pool. Circulation between electrolyte pools is by way of a single circulation loop across a gas break or other device separating inlet and outlet electrolyte. The new feature is the inability of anodes at various electrode potentials, but insulated from one another or cathodes in the same condition to close an electrical or ion kinetic circuit that would otherwise allow them to discharge through their respective separate electrolyte pools.

Advantages of electrolyte convection in this invention include automatic internal cooling and heat balance for batteries and fuel cells. Battery self-discharge and electrochemical cell corrosion can be virtually eliminated by emptying the cell when not in use or drawing current. Also, this invention does not require separators, filters or expensive ion selective membranes to prevent short circuit between polar electrodes.

Galvanic materials lodged within the electrodes of this invention cannot be dislodged or otherwise lost to convective electrolyte because they are configured in accordance with issued U.S. Pat. No. 9,337,474 to the inventor of this application. Suppes uses a packed bed of particles that must be retained by filtering membranes or they will most certainly wash out. A nontrivial issue is the resistance to electrolyte flow offered by any micro porous structure such as packed beds of micron or nano scale particles with permeability significantly less than 2 Darcy. This invention can use the most advanced or emerging nanoscale galvanic material for their associated high specific electrochemical activity in electrodes having unprecedented permeability not less than 2 and often greater than 20 Darcy. Common practice reduces electrolyte flow resistance, if at all, by using larger pores and particles or shortening fluid path through the electrode. Prior art teaches incompatibility of low flow resistance and high electrolyte convection velocity flow through nano or micro scale structures and therefore, teaches against this invention.

There have not been many important examples of convection in electrochemical cells in actual use for a rather significant reason. Heretofore, electrical current density (amp/cm$^2$) in electrochemical cells that produce direct current electricity from stored energy has been limited to very small electrode area specific current density commonly in the range of 0.01 amp/cm$^2$ (batteries) to ½ amp/cm$^2$ (fuel cells). That is a consequence of high ohmic resistance between the active galvanic surfaces producing current by virtue of redox chemical reactions taking place on such surfaces and metal as the current collector. The inventor has measured the resistance of many samples and finds it consistent with literature that deals with the subject. That means 1 amp/cm$^2$ will produce a loss of ¼ to ½ volt in fuel cells that barely generate 1 volt. In Li-ion batteries 10 $\Omega$-cm$^2$ resistance can tolerate little more than 0.008 amp/cm$^2$ especially during the recharge cycle or excessive heat can cause hazardous conditions. The relationship accounts for low current density being accepted as a universal barrier. In popular examples 3.25 Ah capacity over 200 cm$^2$ area needs $\approx 0.01$ A/cm$^2$ or 112 minutes to absorb a 90% charge. Only higher current density at much lower electrode resistance can shorten the recharge cycle.

Low practical current density also accounts for acceptance of diffusion as the ion kinetic mechanism in electrochemical cells even though electrolyte convection at 1 cm/sec is $10^3$ times faster, Bagotsky[2]. Convection accelerates ion transfer between polar electrodes required to support electrical current in batteries and fuel cells. But, if current density is otherwise limited there is little need for convection. The inventor has reduced ohmic resistance to less than 1 milliohm-cm$^2$ which clearly translates into the possibility of very much higher current density and concomitant power in electrochemical cells. Therefore, the need and interest in electrolyte convection follows.

The term, 'galvanic material' is referred to hereinafter and defined as containing carbon (graphene) nanostructures comprising at least one of; carbon nanotubes (CNT) and graphene sheets (GS) having surfaces being at least one of; uncoated, permanently coated with and adjacent, particles comprising one of; catalyst and chemically reactive material that participates in redox chemical reactions that store and release direct current electrical energy. Hereinafter, electrochemical redox active materials are one of; generic faradaic (battery) and catalytic (fuel cell) galvanic materials and used in this invention to comprise structures now identified and defined. Porous galvanic 'membranes' comprise cohesive galvanic material having an uncompressed thickness dimension defined as the average length of vectors normal to and extending from a membrane's first surface to where it intersects the membrane's opposed second surface. The membrane thickness dimension is uniform, meaning it does not vary by more than 10%. Cohesive shall mean the membrane possesses tensile strength not less than 0.1 MPa even though CNT and GS of which it is comprised has individual tensile strength greater than 60 GPa which is more than any other material known. Freestanding cohesive galvanic membranes are often referred to as 'Buckypaper'. Such galvanic material attached to or deposited on metal surfaces when formed as layers thereon are also common as electrodes in the art.

In this invention, galvanic material is not painted on metal surfaces as coatings or pastes containing conductive additives and binders, common in prior art. Rather, in one embodiment, a metal sheet has one surface covered with a plurality of spaced apart metal surface prominences of substantially equal height and minimum enclosing circle diameter. The prominences can be defined as metal finger-like projections and will be referred to hereinafter as spaced apart metal villi extending vertically outward from one surface of the metal sheet, FIG. 1. Any location not at a prominence cannot be further from a nearest prominence than three times the thickness dimension of the galvanic membrane. The sum of all villi enclosing circle areas shall be less than 10% of the metal sheet area, with minimum circle diameter not less than defined membrane thickness. Villi height shall be not more than 10% greater than the membrane thickness dimension. The side of the metal sheet bearing prominences shall compress a membrane against the plain surface of a second metal sheet but villi may not cut or penetrate the membrane. Sustained static compressive force shall be sufficient to cause the electrical resistance between the two metal sheets, as measured by a standard ohmmeter, to be less than $10^{-6}$ $\Omega$-cm$^2$; essentially a short circuit. The applied pressure required will normally be at least 7,000 kPa. It was shown in Fischel U.S. Pat. No. 9,337,474 that such pressure and consequent contact resistance between membrane compression points and a metal surface produces a net functional electrical resistance between active galvanic material anywhere within the membrane and the metal of less than $10^{-3}$ $\Omega$-cm$^2$.

Pressure is applied to and resistance measured between the outer second surfaces of first and second metal sheets as detailed hereinabove. First and second metal sheets and galvanic membrane must have common area dimensions and at least two distinct edges to accommodate electrolyte flow entry and exit. Villi may not have sharp corners or edges so as to not cut or penetrate the membrane. The described structure and pressure under which it functions defines the minimal basic electrode of this invention shown in cross-section in FIG. 2. The 3-layer sandwich can be repeated and stacked to further comprise an electrode of this invention. It is noted that electrolyte can enter an electrode at a metal sheet edge, flow within the electrode over the uncompressed portion of membrane surface and exit at a separate metal sheet edge.

In a further embodiment of electrodes of the invention both metal sheets have matching villi compressing the membrane from its opposite surfaces. The villi of both sheets are aligned so the membrane is compressed between opposing villi. Villi height is ≈10% greater than ½ membrane thickness whereby electrolyte flows over both uncompressed surfaces of the membrane.

In a further embodiment of this structure shown in cross-section in FIG. 3, a first metal sheet is blocked at an electrolyte entry edge and open at its corresponding electrolyte exit edge. The second metal sheet is open at the same electrolyte entry edge and blocked at the electrolyte exit edge. It is a manifold rubric that forces electrolyte to flow through the membrane before it can exit the electrode. Compression causes functional electrode resistance of <$10^{-3}$ $\Omega$-cm$^2$ when measured resistance between first and second sheet outer second surfaces is <$10^{-6}$ $\Omega$-cm$^2$.

In another embodiment of electrodes of the invention a plain square weave metal wire screen, FIG. 4, covers and is adjacent the smooth first surface of metal sheet, FIG. 5. Wire crossover locations create localized prominences serving the same function as above described for metal sheet villi. Plain wire weave defines a square pattern having window side length, here not more than 4.25 times membrane thickness, which assures the same compression criteria stated above whereby any uncompressed location is no more than 3 times membrane thickness from a nearest compressed location. Wire diameter is ≈5% greater than ½ membrane thickness when the screen compresses the membrane against a smooth metal surface. This provision can also assure no more than 10% of the membrane area is compressed. A second smooth metal sheet having a first surface covered by and adjacent the first surface of the galvanic membrane is used to sustain compression of the metal screen and membrane such that electrical resistance between compression sheets is <$10^6$ $\Omega$-cm$^2$. Electrolyte enters the electrode at an edge and flows over the membrane uncompressed surface to exit at a separate edge.

In another embodiment of electrodes of the invention, a single membrane is compressed between two metal wire screens as hereinabove defined and necessarily positioned so that all windows of each screen align in vertical projection, referenced to a tangent plane externally adjacent all screen wire crossovers. Two metal sheets compress their adjacent metal screens whereby electrical resistance between compression sheets is <$10^{-6}$ $\Omega$-cm$^2$. If all screens are not vertically aligned as now above defined, compression will collapse the stack. In a further embodiment of this structure one metal screen, FIG. 6 is blocked at a defined electrolyte entry edge and open at a corresponding electrolyte exit edge. The second metal screen is open at a same electrolyte entry edge and blocked at the same electrolyte exit edge. It is again a manifold rubric that forces the electrolyte to flow through the membrane before it can exit the electrode.

It is possible to coat the opposing tops of villi, FIGS. 2 and 3 or screen wire crossover locations, FIGS. 5 and 6 in brazing or solder so that hot compression will permanently accomplish what sustained compression is meant to do. Galvanic membrane material is stable to 1150° C. so melted solder/brazing will electrically join contact points without damaging the membrane. Solder/brazing also leaves a permanent physical connection at contact points whereby sustained compression of the assembly is no longer required.

FIGS. 7a & 7b illustrate sectional views of a stack of alternate wire screen and membrane. The stack is secured under sustained or hot brazed compression. Section lines are shown in FIG. 4. FIG. 7 is FIG. 6 with many repeated membranes secured between vertically aligned metal wire screen windows. FIG. 8 illustrates how the FIG. 7 stack side-ports are arranged to force electrolyte entering the stack from the left to flow through every membrane, to enter flow paths surrounding each membrane and leave the electrode on the right. Screens are numbered n to n+1 from bottom. Even numbered left side entry ports remain open. Odd numbered on the left are blocked. Open exit ports on the right are odd numbered. Even numbered right-side ports remain blocked. Selected screen edge closure forces normal vector permeation of electrolyte through active membrane layers secured by one of; closely spaced multipoint sustained compression and braze at facing screen crossover locations. There are n+1 screens for n membrane layers. Resistance to flow is normal vector permeability through a single membrane since surrounding flow spaces offer negligible obstruction. It should be understood that what is depicted is only one electrode; either anode or cathode, not both. Various aspects and embodiments of the invention can be summarized as follows:

An electrode for an electrochemical cell, the electrode comprising:

a) One of; 1 and n>1 galvanic membrane(s) having a thickness dimension defined by the average length of vectors normal to the membrane(s) first surface and extending to where they intersect the membrane(s) uncompressed second surface and;
b) A first non-porous metal sheet having first and second surfaces and;
c) A second non-porous dielectric sheet having first and second surfaces and;
d) One of; 1, n and n+1 plain weave metal wire screen(s) with wire diameter not less than one half the galvanic membrane(s) defined thickness dimension and;
e) Wherein, uniform wire mesh spacing is not greater than 4.25 times the galvanic membrane(s) defined thickness dimension and;
f) Wherein, all galvanic membranes lie between a metal wire screen adjacent each of its first and second surfaces in a stack of membrane(s) and screens and;
g) Wherein, a metal wire screen is adjacent at least the first surface of the second non-porous sheet and;
h) Wherein, the second surfaces of the non-porous sheets are subjected to a sustained compressive force of at least 7 million Pascal (7 MPa≈1,000 psi) and;
i) Wherein, metal wire screens are collectively in incompressible vertical alignment.

And:
An electrode for an electrochemical cell wherein;
Brazed joints at wire screen crossover locations replace sustained compression.

And:
An electrode for an electrochemical cell wherein;
One of; sustained compressive force and brazing at wire screen crossover locations produces electrical resistance between first sheet and metal screen adjacent the second sheet of not greater than 1 µ-ohm.

And:
An electrode for an electrochemical cell wherein:
a) All sheets, membrane(s) and wire screens share common area dimensions and;
b) Area dimensions define at least first and second distinct edges and;
c) Screen number 1 adjacent the first surface of the second sheet and every subsequent odd numbered screen in the stack is blocked to electrolyte entry at the defined first edge and open for electrolyte exit at the defined second edge and;
d) Screen number 2 and every subsequent even numbered screen in the stack is open for electrolyte entry at the defined first edge and blocked to electrolyte exit at the defined second edge.

FIG. 10 is the equivalent of FIG. 8 using 2-sided matching metal villiform screen one of which is shown in FIG. 9.

It will be understood that the galvanic membrane comprising at least one of; CNT, GS and mixtures thereof contain high concentrations of graphene molecular structure surface area. The membrane volume fraction occupied by carbon surface structure depends on the application. Battery electrodes minimally need ≥2 weight-% to allow for maximum galvanic active material volume. A 100 µm thick membrane can contain 800 cm$^2$ of active surface per cm$^2$ electrode area. On nano-coated surfaces used in fuel cells and ultrahigh capacity asymmetric pseudosupercapacitors >30% volume provides >2,500 cm$^2$ in a 100 µm thick membrane. The stack of galvanic membrane and metal wire screen shown in FIG. 8 is a single composite electrode having extraordinary concentration of redox active mass and surface area connected to cell terminals with unprecedented low electrical resistance.

The discovery that galvanic particles not otherwise attachable to CNT or GS surfaces as a lodged and immobilized coating become equally lodged and immobilized within galvanic membranes of this invention when membranes are incorporated as hereinabove described in a composite electrode under pressure was disclosed in U.S. Pat. No. 9,337,474 and co-pending cases on file. Absent closely spaced multipoint compression of the membrane, particles not securely attached to graphene surfaces will wash out when subjected to convection of mobile electrolyte. It is a novel and crucial feature of this invention for specific purposes.

The preferred embodiment for electrodes of this invention is according to FIG. 8 using metal wire plain weave screen because it is readily available and very economical. 55 µm wire in 60 mesh plain weave (inverse of wire spacing in inches) can use 100 µm thick membrane. 177.5 µm (7.1 mil) wire works with a 350 µm thick membrane and 17 mesh. There is 20 µm stainless wire to accommodate 38 µm thick membrane (about a lower limit for this configuration) and 160 mesh. For all these practical examples the fraction of membrane area compressed and related wire volume is less than 5%. If flow channels occupy <10% of electrode volume to ensure negligible flow restriction, about 85% remains for active galvanic membrane volume. That is an important metric in electrochemical cell design.

Electrolyte flow resistance for electrodes of this invention in accordance with FIG. 8 is not more than that of a single membrane. FIG. 11 provides some examples. Resistance to flow over membranes is negligible but less important because it requires ion diffusion through the membrane which slows the electrochemical process. When electrolyte can flow intimately over every active particle, diffusion is a negligible factor in ion exchange kinetics. Diffusion time constant varies inversely with diffusion path length squared. For galvanic membranes suitable for use in this invention permeability is at least 2 Darcy and generally greater than 20 Darcy as proven by the data of FIG. 11.

Another transformative feature of this unique convection electrode architecture is the fact that effective convection takes place within an ultrathin extremely large area electrode. In prior art, porous convection electrodes are thick in order to hold a suitable mass of active galvanic material. There the electrochemical process begins in a thin electrolyte entry zone and works its way toward the far end of the electrode whereby electrolyte must pass through a considerable length of spent material. The same defect can apply to electrodes of FIG. 7*b* if only configured for electrolyte flowing over a membrane. FIG. 8 architecture provides thin convection electrodes where their effective area is one layer area multiplied by the number of layers in the stack. It is superior to all examples in known prior art. Furthermore, each layer is connected to cell terminals with ultralow ohmic resistance so their area specific current density can be more than two orders of magnitude greater than what is now possible with electrodes in any prior art application. The effective electrode area is multiplied by the number of layers in the stack so net current level possible with the composite electrode and therefore power density becomes positively transformative.

A unit cell is one anode and one cathode paired and configured to allow electrolyte to flow as described above sequentially through both. Anode is differentiated from cathode by the galvanic materials contained within their respective membranes. FIG. 12 shows one electrolyte recirculation loop through two composite electrode stacks. Flow direction is arbitrary and reversible. The flow path contains a pump and electrolyte reservoir with gas dividing the flow path to prevent discharge by way of electrolysis in the flow loop caused by the potential difference between anode and cathode. The composite electrodes could be spaced apart 4-sided stacks but are conveniently shown as concentric annular stacks.

An annulus has two edges; one each for electrolyte entry and exit as previously described hereinabove. Additional edges need to be sealed and merely add unnecessary complexity. An inner annular composite electrode stack contains a central lumen suited to electrolyte access and outer cylindrical surface. An outer annular composite electrode stack defines a cylindrical inner surface spaced apart from the outer cylindrical surface of the inner stack. Radii of each stack are configured to create the cylindrical annular gap between facing surfaces of the composite electrodes. The outer annular composite electrode stack defines a cylindrical outer surface as one surface of a chamber fitted to collect electrolyte for circulation. This unit cell electrode topology is not unique in electrochemical art although not much used in convection electrochemistry. It is convenient for what follows.

The unit cell of FIG. 12 is capable of inordinate current at virtually negligible resistance delivered to its polar terminals. The following invention discloses how high voltage can balance amperage for optimum practical power density. FIG. 13 depicts several unit cell stacks, each being as described for FIG. 12. They are separated by a plate containing a metal conductor carrying current between an anode of a first (lowest) unit cell to the cathode of the next adjacent unit cell above. The separating plate also contains two insulating sections that prevent the cathode of the first (lower) unit cell from shorting to the anode of the next unit cell above it. The sequence can be repeated in the same fashion for as many unit cells in a stack as needed to produce a desired voltage. The end plates provide anode and cathode terminals and intermediate plates seal off electrolyte in the gap of one cell from mixing or even 'seeing' electrolyte in the gap of an adjacent cell. Isolation of electrolyte in the gap of each unit cell is essential to prevent discharge through electrolyte pathways. Note the inner lumen communicates only with anodes and the outer chamber communicates only with cathodes. That feature, additional electrolyte shielding as further described below and the unit cell separating plates comprise a novel invention for the following reasons.

Self-discharge between electrodes through connected electrolyte pathways at different levels using simplified single pump circulation has discouraged prior art application of convective mobile electrolyte in spite of its known advantages. In series connection there is a sequence in the line of unit cell wiring where a single anode is electrically connected to a single cathode so either can function as the other. If a path can be traced through electrolyte connecting any such dual identity pair that exist at different potentials it is like dipping the terminals of a battery into electrolyte. Whether or not the composite cell is connected to a load, it can discharge through the electrolyte pathway even though that path does not conduct electricity. The migration of ions within the cell functions as a reverse charging process. When connected to a load it represents a parasitic current opposing the one serving the load.

Having identified such a parasitic electrolyte pathway there are two factors to consider; 1) the electric field between electrode pairs at different potentials and 2) the migration (flow) of ions in directions trying to cancel inter electrode ion exchange between unit cell electrodes that supports current to a load. The electric field tries to move anions and cations to the wrong electrodes. They actually 'flow' by diffusion in opposite directions, both antithetical. An electric field can be blocked by metal insulated from polarity and diffusion by opposed convection. Both are provided by this invention in unique ways as seen in FIG. 13. Anodes and cathodes are arranged, respectively, to face separate anode and cathode pools of electrolyte and are 'screened' from those pools by actual fine weave metal screen or a metal wall penetrated by one of; one and a plurality of small holes; with either screen or wall being supported by dielectric insulation. The holes or screen mesh is configured to cause at least 1 cm/sec convection velocity of electrolyte flow through the screen or holes as a result of forced electrolyte circulation through the composite cell. That convection velocity overwhelms the diffusion of ions trying to migrate to electrodes from the respective common pools of electrolyte shared by all anodes and all cathodes. With fully isolated electrodes, a single pump, circulation loop and electrolyte reservoir containing gas is sufficient to service a large number of series connected unit cells with voltage multiplication in either a convection battery or fuel cell without self-discharge through electrolyte circulation pathways. The latter defect has prevented using electrolyte convection to its known advantage for accelerating redox chemical reactions in prior art. In FIGS. 12 & 13 there is no membrane required in the gap between positive and negative electrodes. Flow channels are macroscale for electrode permeability of at least 20 Darcy when electrolyte flows over thin galvanic membranes. It is approximately 2 Darcy when electrolyte flows through thick galvanic membranes for better electrochemical efficiency, FIG. 11. Both require convection velocity of at least 1 cm/sec for high current density that depends upon fast inter-electrode ion exchange. Faster convection velocities are practical in this invention because electrolyte convection resistance is so low. Bagotsky teaches that 1 cm/sec electrolyte convection velocity will move ions 1000 times faster than diffusion in electrolyte. That is the primary motivation for electrolyte convection in fuel cells and batteries. Further and in stark contradiction to previous practice macro channels rather than nano scale pores or channels are required here to retain nanoscale galvanic materials. For point of reference 2 Darcy means the pressure gradient across a 1 cm thick electrode is ½ atm or about 7.5 psi using 1 centipoise viscosity at 1 cm/sec convection velocity. In this invention, it is only necessary to use galvanic membranes much thinner than 1 cm and all in parallel rather than sequence. That is why electrolyte circulation can be very fast and current density higher than has ever been achieved in prior art. When electrical resistance is less than $10^{-3}$ ohm-cm$^2$, 10 amps/cm$^2$ can be produced in a fuel cell or 1 amp/cm$^2$ in a rechargeable battery. Such combination of energy storage capacity and power density is positively transformational.

Compression of a cohesive galvanic membrane between opposed metal prominences with >700 Newton/cm$^2$ force is actually >14,000 Newton/cm$^2$ because of a pressure multiplier due to only <5% of the membrane being compressed. That pressure reduces electrical contact resistance at compressed locations virtually to 0 ohms and prevents the pellicle from coming off of the metal regardless of multiple expansions and contractions due to repeated charge discharge chemical reaction cycling. Compression locations are closely spaced so when material bulk resistance is taken into account, electrode resistance is less than $10^{-3}$ ohm-cm$^2$ averaged over its surface. Prior art cell architecture creates grooves and depressions in pellicles and attached layers to accommodate material distortion and prevent peeling from a conductor in normal use; not otherwise to improve electrical conductivity to the conducting surface. Contrary to this invention, the remaining material is at least somewhat compressed by assembly in a spiral wound or plate structure. Such structures can only compress an entire layer wherein it could not function for its intended purpose if compressed to substantially lower ohmic resistance. An example of a concept that may appear similar but is radically different in accordance with this invention is shown in a micro photograph, FIG. 17. It is a cohesive pellicle removed from an electrode and somewhat wrinkled upon drying but still showing distortions in its surface. The grooved impressions are the result of pressing a square weave metal screen against the pellicle onto a metal current collector in an electrode. The wire cross points apply enough pressure to virtually eliminate contact resistance at those locations whereas between those locations the pellicle needs little, if any, electrical contact with the metal. Between compression points it can come completely off the metal backing but it remains uncompressed and electrochemically active. It has room (volume) to expand and contract with impunity. Yet, resistance between pellicle as a whole and supporting metal remains more than three orders of magnitude lower than conventional assemblies because distance between compression points is short and material bulk resistance is low. See FIGS. 15 and 16.

In this invention stack compression serves a vital purpose beyond immobilizing galvanic materials. Macro channels are low resistance fluid conduits that compress layers at a plurality of defined small areas separated by short distances which are a multiple of the thickness, e.g. 0.1 to 1 mm of a layer. >95% of the layer remains uncompressed and functions normally. Net resistance between active galvanic surfaces and metal, referred to electrode area, drops from about ½ $\Omega\text{-cm}^2$ in fuel cells or 10 $\Omega\text{-cm}^2$ in Li-ion batteries to an unprecedented level of less than $10^{-3}$ $\Omega\text{-cm}^2$ when membrane layers are compressed against a metal conductor with pressure applied to defined small areas of 7,000 to 30,000 kPa depending on current density expected. More than 100 times the current density in batteries and 10 times in fuel cells becomes possible because the voltage loss for that current is only 0.01 volt in batteries. Prior art voltage loss at that current density would exceed the voltage produced in most cases; clearly impossible.

In most cases cathodes in batteries and fuel cells suffer from the slowest reaction rate and require the greatest weight and volume of active galvanic material, whether faradaic or catalytic. Improving cathode materials is the focus of much ongoing materials research but cathode function is more easily improved as here described. It is convenient to select the inner annular electrode as the anode because it requires less volume than the cathode and volume varies as radius squared for fixed axial length. The real benefit comes from choosing the direction of electrolyte flow from inner chamber, through the inner anode electrode, through the gap and into and through the outer cathode electrode. Electrolyte passing first through the anode acquires excess cation concentration which accelerates cathode reactions according to ordinary chemical reaction kinetics. Electrical area current density referred, to cylindrical electrode faces, is proportional to the product of cation concentration and convection velocity. Battery recharge flow can but does not have to be in the reverse direction in most cases.

For a chosen electrode volume, electrolyte residence time within the electrode will be determined by radial dimension, stack height and convection velocity. The latter places a limit on maximum power for meeting load demand. These degrees of freedom are not available to stationary electrolyte and can more easily accommodate cell design to the load, especially in fuel cells using complex hydrocarbon fuels, e.g. DMFC. Residence time in the anode can be increased to virtual completion of fuel oxidation independent of convection velocity. That is important because reaction gases and unconsumed fuel can poison the cathode oxygen reduction reaction, ORR catalyst. High temperature operation further discussed below will mitigate incomplete oxidation and CO production.

Batteries using intercalation of metal cations, e.g. $Li^+$, metal hydride (MH) or multivalent versions, e.g. $Mg^{2+}$, $Al^{3+}$, etc. in anodes do not alter their aprotic or aqueous electrolyte on a trip through both electrodes. Except for MH these metals can be intercalated on carbon surfaces or Si coatings of CNT surfaces. Cathodic material is usually 3 to 5 μm spinel or Chevrel phase particles that can be lodged and immobilized in cohesive CNT membranes as previously described. Convection velocity should be coordinated with available area concentration of faradaic material in the electrode for maximum power density. Batteries that alter electrolyte on a pass through either electrode, e.g. Ni/Fe, require coordination of convection velocity with, e.g. $(OH)^-$ anion concentration. In that case high power requires high alkali concentration, convection velocity and faradaic material loading.

Fuel cells of this invention operate without a fragile polymer semipermeable ion selective membrane or filter at elevated temperature. 80% KOH can be used at 300° C. and 100 psi fuel and air/$O_2$ pressure with non-noble catalyst and only minor overvoltage. Molten carbonate at 700° C. is flowable with 3.1 cp viscosity and can be used with Ni type catalyst CNT coatings having less overvoltage than Pt. Because galvanic membranes used in this invention do not need or incorporate binders their temperature tolerance is 750° C. in air and 1150° C. otherwise. At these temperatures any hydrocarbon fuel is a candidate for direct fuel oxidation (sans $H_2$ reformulation) in this invention.

Mobile electrolyte convection offers a unique opportunity to accelerate catalytic surface activity for anodic H or $H^+$ adsorption required for hydrocarbon fuel oxidation, HOR as well as cathodic $O_2$ reduction, ORR. Bockris[8] teaches that the catalyzed redox process occurs mainly and actually only effectively in a very thin layer of electrolyte attached as a meniscus film to the catalyst surface. Diffusion from the gas phase, through the liquid or ionomer electrolyte film and to the catalyst surface is slow and is only appreciable in a thin film where the diffusion length is short. For liquid fuels (e.g. methanol) dissolved in moderate temperature static liquid or solid electrolyte, reaction products accumulate on catalyst surfaces to further slow the process and polarize the electrode. Mobile electrolyte tends to depolarize the electrode but produces a liquid boundary layer that is thinned by fast convection velocity. Still it offers greater diffusion resistance than a meniscus edge.

The highest concentration of gas/liquid menisci is foam. Such could not be sustained in a fuel electrolyte mixture without convection. At a planned fuel cell operating temperature of 300° C. all useful hydrocarbon fuels are gas phase as, of course, is $O_2$/air. Micro-foam producing spargers based upon venturi suction of gas into flowing liquid can produce stable flowable foam comprised of fuel gas and electrolyte. The device can be connected to the fuel/electrolyte inlet but is otherwise separate from the cell. Such foam flowing through permeable CNT membrane present an unprecedented interface of electrolyte menisci saturated with fuel covering nanoscale catalyst surfaces. Rapid redox reaction (Bagotsky) fills the foam with reaction gas and steam which proceeds to the gap where it crosses to the cathode. Interaction with catalyst surfaces through saturated menisci is well understood to be exceptionally efficient. Oxygen containing gas is pumped into the foam through tubes placed within the gap as shown in FIG. 14 and running the full axial length of all cells in the stack. Tubes are porous dielectric spargers made of ceramic frit or tubes with many small holes. They penetrate but are sealed to plates separating unit cells. Thus, electrolyte cannot communicate between cells. Other foam producing devices can be suitable for the stated purpose.

With further reference to FIGS. 12, 13 and 14, electrolyte exiting the cell is led through conduit tubing to an accumulator chamber containing gas. The gas is for illustration purposes to show a physical break in the electrolyte path. The break interrupts what would otherwise be a closed electrolyte loop between electrodes for a unit cell but serves other purposes as well. In a high voltage battery stack the gas volume absorbs volume changes within the battery for charge/discharge cycling, reconstituting electrolyte and holding it to drain the cell for storage. In fuel cells the gas/liquid interface is a defoamer and reservoir for maintaining pressure and releasing exhaust. One pump takes liquid electrolyte from the reservoir and returns it to the cell anode.

An entirely new benefit embodied by the electrode configuration of this invention as seen in FIG. 13, refers to a stack of a plurality (3 are shown) of unit cells connected in series to build high voltage. The unit cells are separated by a dielectric spacer to insulate adjacent anodes from one another and adjacent cathodes from one another. All inner and outer electrodes throughout a stack of repeated unit cells must be, respectively, either anodes or cathodes. All outer electrodes must be of opposite polarity to the inner electrodes. Thus, center and outer electrolyte chambers respectively see one polarity.

Adjacent unit cell faces are electrically connected within separating plates as follows: A first unit cell in a stack of N unit cells is unit cell #1 with its inner electrode connected to a terminal for connecting to a load. Every successive unit cell in the stack, including the first, has its outer electrode electrically connected to the inner electrode of the next adjacent unit cell, i.e. outer of N to inner of N+1. It is important that the inner electrode of n is connected to the outer electrode of N−1 but is NOT otherwise connected to any other electrode. The outer electrode of N is connected to a terminal for connecting to the load. All electrodes are electrically connected at only one axial end. The stack may be inverted with no other consequence than reversing the inner/outer numbering description.

A unique benefit of the above arrangement is an ability to isolate every electrode from electric field and ion kinetic communication with every other electrode except the one it faces to create battery potential and current. Metal shields, insulated from any polarity allow electrolyte convection through electrodes and common electrode collection pools with circulation of the latter through a single pump. For a single unit cell it was not especially important but when a stack of n cells is charged to N times V where V is unit cell voltage, the matter becomes important which the following example will illustrate.

The conventional series connected convection electrode stack can be represented by a longitudinal arrangement of anode/cathode unit cells oriented with anodes connected to cathodes and for comparable convection, electrolyte chambers are fixed on opposite sides of the long axis of the stack. Electrolyte enters anodes on one side of all cells collectively to leave from cathodes in similar fashion on the other side so circulation can be effected by a single pump. This is as closely analogous to the instant invention as may be possible. A defect is apparent in that each unit cell drives voltage in one direction but, where anode is series connected to cathode, an electrolyte path through either or both chambers exists where the series connection closes the circuit of a unit cell in the opposite direction. Even worse, one can draw as many opposing cells between higher voltage pathways as cells accumulating voltage in the intended direction. Longitudinal convection through the stack, even if it were possible, only makes matters worse because it aids reverse voltage more than the intended direction. The conventional solution is a separate circulation path for each series connected cell. That accounts for their absence from the literature.

Embodiments of this invention comprise composite galvanic electrodes constructed by stacking layers with ultralow resistance connection to cell terminals through immobilized cohesive galvanic membranes comprising at least one of; nonwoven single-walled carbon nanotubes; nonwoven multi-walled carbon nanotubes; a single or plurality of layers of graphene sheets; one of; single-walled and multi-walled carbon nanotubes attached to one or both sides of metal sheet or woven carbon fiber; and combinations thereof; and wherein the nanoscale surfaces of these structures are one of; coated with galvanic material and adjacent galvanic particles lodged therein and immobilized.

FIGS. 18 and 19 are SEM photographs of cohesive CNT membranes respectively as formed without and with lodged and immobilized faradaic particles. It is on the nanoscale surfaces of CNT within membranes or the particles they entrain where galvanic current is produced. In this invention they are connected with very low ohmic impedance to a metal current collector to support exceptional electrical current density.

FIG. 4 depicts a typical square weave metal screen or cloth. The screen is used because it has a pattern of closely spaced small areas where its thickness is two incompressible wire diameters. Everywhere else its thickness is 0 or one wire diameter. Wire cross locations and windows can be stacked in alignment to provide an incompressible structure with macro channels for low resistance electrolyte flow in any direction. It comprises a low cost electrode with negligible ohmic resistance connection to galvanic membranes.

A convection battery and fuel cell require alternate layers of wire screen and galvanic membranes comprising internal nanoscale components, e.g. CNT, galvanic materials, etc. They are immobilized by compression between aligned wire crossover locations of a wire screen and together comprise one layer in the stack of layers comprising the composite electrode. The 'galvanic membrane' must have thickness less than two wire diameters in order to leave channels for tangential electrolyte flow on both surfaces of the pellicle. Ion mass transport kinetics is a combination of diffusion within an electrolyte permeable pellicle and convection over or through it. Electrical current is essentially instantaneous at low resistance but cannot exceed ion current. Diffusion time interval is proportional to the square of diffusion path length which, in some cases, favors thinner pellicles holding less galvanic material per layer.

Galvanic membranes can be made with sufficient normal vector permeability to allow electrode layer entrance and exit port sequencing for electrolyte to take better advantage of that property. A galvanic membrane placed between two screens can be subject to normal vector permeation merely by alternating clear and blocked screen edges. Channel entrances with respect to one edge of a screen are open but sealed on the electrodes opposite surface. Thus, when electrolyte enters the electrode through open channels on one surface it is forced to flow into screen channels that do not block its ability to leave at the electrodes opposite surface. Electrolyte must flow through the pellicle into a separate screen. It leaves the electrode from the surface opposite that at which it entered. Diffusion is much accelerated because pellicle internal pathways are very short.

BRIEF DESCRIPTION OF THE ACCOMPANYING DRAWINGS

DETAILED DESCRIPTION

While the present disclosure has been presented above with respect to the described embodiments of a convection electrochemical cell, it is to be understood that the disclosure is not to be limited to those illustrations and described embodiments. Accordingly, reference should be made primarily to the following claims rather than the forgoing description to determine the scope of the disclosure.

The nuances and subtleties of this disclosure can be described with specificity by use of specific definitions of terminology. The description uses accepted dictionary definitions and adds precise parametric limitations as needed. The term 'galvanic' means, 'of or relating to direct-current electricity, especially when produced chemically'. It will be used as a modifier, 'galvanic material' and is here referred to as material of description relevant to this disclosure having established galvanic properties. 'Membrane' shall mean 'a thin sheet of natural or synthetic material' that is permeable to substances in solution. 'Cohesive' implies tensile strength. It is a 'mat' if freestanding for normal handling. 'Sheet' means, 'A broad mass or piece of material characterized as having area enclosable by a circle of defined diameter. Membranes and sheets have a thickness dimension drawn normally from a first surface to an enclosing second surface that is less than $\frac{1}{10}^{th}$ of the defined enclosing diameter dimension and varies by no more than 10% of a membranes natural uncompressed state. In this disclosure an electrically conducting porous membrane may be referred to as a galvanic membrane and has first and second surfaces adjacent conducting surfaces. The conducting surface is metal and is porous and permeable to electrolyte in this invention.

Electrochemical cells of this invention use mobile electrolyte passing between negative anodes and positive cathodes at somewhat elevated pressure in battery embodiments or 75 to 100 psi at 300° C. in fuel cell versions (700° C. for molten carbonate). Reasons for these operating regimes will be made clear. An Apollo module used 50 psi, 230° C., Ni anode and NiO cathode catalyst with excellent results but the concept was abandoned because such convection battery architecture cannot be series connected in multiple cell banks for higher voltage. This disclosure explains and solves that and other problems with the prior art.

If the electrical resistance R of electrochemical cell (fuel or battery) electrodes producing an open circuit voltage, $V_o$ is reduced without compromising electrode energy capacity or catalysis, electric current, i can be increased as the iR voltage decrement is reduced. Power or rate of charging, $iV=V^2/R$ also increases. This invention shows how to substantially reduce ohmic resistance in the electrode. The following confirms that such reduction is not accompanied by a reduction of energy capacity, density or content in either electrode.

Figure 18:
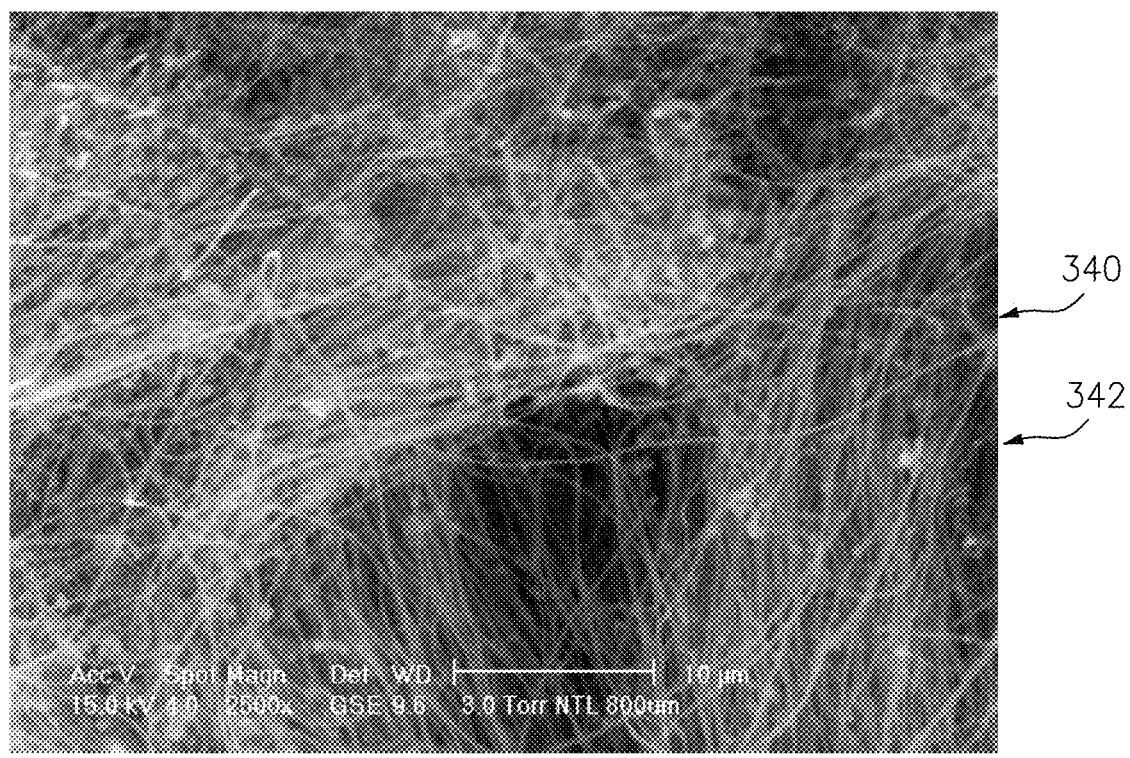
FIG. 18 is an SEM photo image of a cohesive carbon nanotube membrane made by the inventor.
Figure 19:
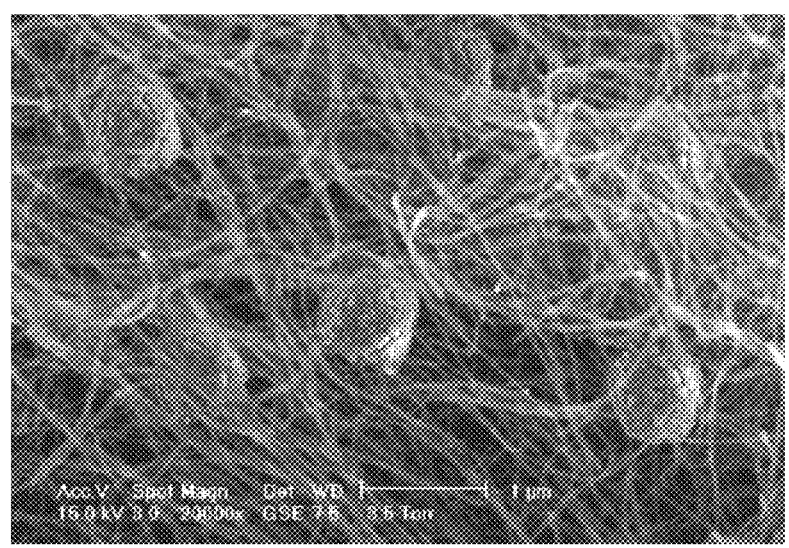
FIG. 19 is an SEM image of a carbon nanotube membrane similar to that of FIG. 18 with added lodged and immobilized galvanic particles (faradaic in the example) captured by the CNT multiwall fibers.

A primary component of this invention is the cohesive nonwoven CNT membrane mat material as structure containing one of; active faradaic and catalytic material either as strongly coupled coatings on CNT or as particles lodged and immobilized between nanotubes. FIG. 18 is an SEM photo of a CNT membrane made by the inventor and similar FIG. 19 shows added particles. The density of a CNT Chiral fiber is 1.4 g/cm$^3$. It has a lattice parameter of about 1.65 nm and there is little variation of these parameters among the various forms. Density of cohesive nonwoven CNT membrane varies from 0.2 to 0.5 g/cm$^3$. Therefore, a volume fraction of CNT in electrodes of this invention is about 14% to 35%. That leaves 86% to 65% empty space for electrolyte and active battery material. Assuming 20% for electrolyte wetting of CNT surfaces, about 55% of membrane volume remains for active battery material mass. Catalyst uses less volume in a fuel cell.

Figure 16:
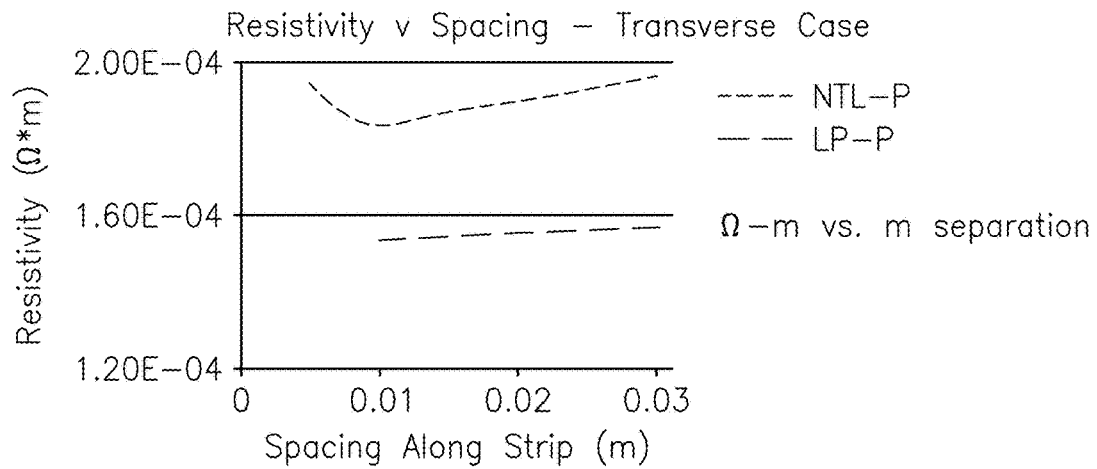
FIG. 16 is membrane bulk resistivity data in the plane of the sheet for configuring closely spaced multipoint compression to $10^{-6}$ ohm to achieve net membrane resistance less than $10^{-3}$ ohm-cm$^2$ into a metal current collector.

There is improvement in bulk resistivity of a CNT mat made from dispersed CNT having length of 20 to 30 μm when the CNT is coated with electroless Cu or Ni. Approximately 2 Wt-% of Cu plated CNT added to standard CNT, either coated or uncoated with active galvanic materials will lower in-plane resistance; FIG. 16 when the mat is sintered under 100 psi at <900° C. in a vacuum oven. The temperature is easily tolerated by these materials that are generally made at similar temperature. There is no binder or membrane in the mat to interfere with useful sintering. When the membrane is removed from the oven it is a freestanding cohesive electrode with low bulk resistivity. It is an essential property of the material for use in this invention but the main focus and novelty is ultralow resistance when connected to an electrical current collector.

Active cathode materials usually require more volume with faradaic material density of 4.1 g/ml and energy density in a Li-ion battery of 0.658 Wh/g. It will be shown that only 15% of membrane volume is needed in this invention for metal conductive structure and electrode flow channels combined. Correcting for all inactive volume, the volumetric energy density is 1.26 kWh/L for the cathode in a convection battery. It is the energy storage driver since Li metal is substantially more compact especially as stored in Si coatings of anode CNT. The combined polar electrodes yield an energy storage capacity of ≈1 kWh/L as a conservative but reasonable estimate. That exceeds industry standards because additional cooling volume is understood to not be required in ultralow resistance electrodes.

Electrically conducting galvanic material is at least an electrically conductive porous membrane (hereinafter referred to as an Active Membrane, (AM). It comprises at least one of; cohesive nonwoven single- and multi-wall carbon nanotubes (SW- and MWCNT), single and multiple layers of woven CNT, single and multiple layers of graphene, single and multiple layers of woven and cohesive nonwoven carbon fiber, single and multiple layers of woven and cohesive nonwoven TiO$_2$ nanotubes or nanofiber and combinations thereof. The tensile strength of cohesive nonwoven structures shall be at least 2 MPa so they can be handled as freestanding pliable membranes. Tensile strength of graphene or CNT is greater than anything on the planet measured at 60 GPa. Preferred CNT for AM comprise a mixture of lengths; 15% (MWCNT at 500 to 1,000 μm) and the remainder SWCNT at ≈100 μm. Temperature tolerance of the materials is 750° C. in air and 1150° C. otherwise. They are inexpensive and commercially available.

Galvanic materials used as hereinabove described for supercapacitors without added faradaics for batteries or catalyst for fuel cells have not been widely used for either in prior art. Very high concentration of electrode surface area to support an ionic double layer with negligible ion kinetic issues motivates their use in supercapacitors. Surface area of 1,500 to well over 2,000 m$^2$/gram is possible with the described galvanic material. However, prior art electrical contact resistance between galvanic membrane and a metal surface remains too high to obtain otherwise possible energy and power capacity for any of the electrochemical cells that are the subject matter of this disclosure using mobile electrolyte. High power super- and pseudo supercapacitors holding coated CNT are rapidly depolarized by convective electrolyte.

Some of the most advanced faradaic battery and catalyst fuel cell anode and cathode materials are in the form of particles having enclosing spherical diameter in the range of ½ to 10 μm. Prior to this invention they could not be incorporated into porous AM structure as freestanding electrodes because their position and distribution within AM cannot be stabilized merely by holding them against metal backing with a covering membrane. Particles are used in paste applications with binders in prior art. A discovery of singular importance in this invention is the ability to stabilize these particles within the AM as a direct consequence of its novel method of attachment for low electrical resistance purposes. Particles as well as CNT surface strongly coupled coatings can comprise ≈50% of galvanic membrane volume. Particles are uniformly distributed within the membrane's volume in the process of forming the membrane. In the case of nonwoven CNT they can be co-precipitated from suspension. For woven and graphene single sheet structures they are applied as weakly coupled particle coatings to one side of each layer prior to stacking of multiple layers. Particle surface layer applicators are known in the art. Thus, particles become entrained but not yet immobilized within the galvanic membrane structure.

Important faradaic particles are spinels, multivalent Chevrel phase and hydrogen storing metal hydride (MH). Also found in the literature are strongly coupled CNT coatings of virtually all metals, cathodic and catalyst metal oxides and hydroxides, e.g. NiO, $MnO_x$, NiOOH as examples in HOR and ORR redox chemistry.

Mobile electrolytes are aprotic Li salts commonly used in Li-ion batteries and aqueous alkali otherwise. Batteries will benefit from antifreeze electrolyte for cold weather service, in particular, KOH at 31.5% or 7.34 molar with a eutectic at −65° C. It is superior to NaOH for this purpose. It is desirable to use maximum possible alkali concentration as ion convection defines electric current. At 40% or 10 molar there is still considerable freezing point depression but at 50% being 14 molar, KOH alkali becomes solid and only usable at higher temperature and pressure.

It is useful to explain convection's purpose with reference to these concentrations. Suppose electrolyte is flowing through 1 $cm^2$ electrode area at velocity, ú which also represents the volume flowing through 1 $cm^2$ per second. Molar concentration, M, electron charge, $e_c = 1.6 \times 10^{-19}$ coulomb and Avogadro's number, $N_A = 6 \times 10^{23}$ atoms/mole defines current in amperes/$cm^2 = (M/10^3)$ú$N_A e_c$. It represents the number of alkali cations available to the anode for redox production per second and is equivalent to electrode current density. If M is 10 and ú is 1, $i < 10^3$ $A/cm^2$. Such is the power of convection but the objective is 1 rather than 0.01 $A/cm^2$ top charging current possible in the best available commercial batteries. Then, i can recharge the battery in minutes instead of hours. Thus, a fraction of area specific velocity is used at best molarity to preserve inter-electrode convection required by the invention current density as a net volumetric parameter.

Fuel cell electrolyte interacts with catalyst surface and gas and operates at higher temperature and pressure to enable catalysts other than noble metals, e.g. Ni, NiO, $MnO_x$ or advanced and emerging versions appearing in the literature to carry out redox chemistry. NASA used 230° C., 75% KOH and 50 psi. 300° C., 80% KOH and 100 psi is used here to replace Pt and Ru with comparable activity and limited overvoltage. The proposed convection cell embodiment architecture and materials are designed to withstand both pressure and temperature. Even molten carbonate at 700° C. is a suitable electrolyte comprising $Li_2CO_3/Na_2CO_3$ at (48/52 mol/mol) ratio salt. That provides Ni and NiO, respectively with faster HOR and ORR catalysis activity than any noble metal. Because CNT is easily plated with nanoscale Electroless Ni and NiO it is a desirable substitute for porous $LaMnO_3$ in the cathode whereas the anode contains dispersed $LiAlO_2$ and/or $Li_2TiO_3$ ceramic particles to stabilize the otherwise strongly coupled Ni. Molten carbonate electrolyte flows at a viscosity of 3.1 cp.

Ultralow resistance electrodes begin as electrically conductive porous membranes (AM) and are freestanding components comprising a plurality of basic nanoscale graphene structures (e.g. sheets or tubes, CNT) as specified hereinabove. Carbon surfaces are one of; coated with strongly coupled galvanic material and combined with galvanic particles held within the membrane. In novel electrolyte convective electrodes of this invention both membrane first and second surfaces are adjacent a porous conducting surface. AM, or electrically conducting porous membrane and electrically conducting surface are building blocks of the present invention.

Electrical contact resistance between an AM surface and, e.g. metal, is too high to be of advantage over ordinary paste applications that, counterintuitively, have similar contact resistance. The purpose of this invention is to reduce that resistance by several orders of magnitude. It is implemented as follows. AM first and second surfaces are respectively adjacent separate porous conducting surfaces whereby, a) not more than 10% of AM area is one of; sustainably compressed against and brazed onto the conducting surfaces, b) no point within one of; an uncompressed and unbrazed area is more distant from a nearest one of; a compressed and brazed area than three times the mean uncompressed thickness dimension of the AM defined as being measured prior to placement between conducting surface and c) electrical resistance measured between the conducting surfaces is less than 10 micro-ohm, $\mu\Omega$. The value is physically measurable by ohmmeter probes.

This invention does not require separators, filters or expensive ion selective membranes to prevent short circuit or exchange of galvanic materials between polar electrodes. Galvanic materials as strongly coupled sheet or CNT graphene coatings or lodged and immobilized galvanic particles within the electrodes of this invention cannot be dislodged as configured in accordance with U.S. Pat. No. 9,337,474. This invention can use the most advanced or emerging nanoscale galvanic material for their associated high specific electrochemical activity in electrodes.

The term electrical conduction sink is defined as having virtually zero ohmic resistance to electrical conduction. In the instant invention they comprise a plurality of proximally spaced apart discrete areas wherein the full thickness of the galvanic membrane material is one of; compressed against and brazed onto the metal surface. Compression or brazing should not sever high tensile strength fibers or graphene layers comprising the sink. Those should lead unaltered into and become contained within the sink. Touching, i.e. ordinary contact with the sink by severed graphene merely creates the same electrical conduction barrier that produces high resistance between galvanic material and an adjacent metal surface. Thus, even if galvanic membrane comes completely off of the metal surface between sinks, as is common in ordinary use, it is of no account because that form of contact contributes little or nothing to the main electrical conduction path provided by the sinks.

With reference to the design of FIGS. 1 through 8, the following calculation considers typical membrane compression patterns among an infinite number of possibilities that guarantee the novel criteria describing the instant invention, namely, that no uncompressed location within the membrane is further from a nearest compressed location than three times the membranes defined thickness. Patterns considered will be a hexagonal, square and 60° triangle pattern of a plurality of circular compression areas and a pattern of contiguous square ribs. All will have less than 10% compressed area. The following shows that any pattern of a plurality of spaced apart noncontiguous compression areas is preferred over contiguous or discrete line segments. Nevertheless, the invention is not limited to a particular pattern so long as the novel criteria are met.

In a hexagonal pattern compression locations must be separated by ≤3 t. t is membrane thickness. The enclosing circle diameter, d of each compression is ≤1.22 t or about ⅓$^{rd}$ of the spacing, D between them. That limit is easily met. If a pattern is based upon a square compression distribution, compression locations must be separated by slightly less restrictive ≤4.25 t and the compression diameter values are d≤1.51 t or ≤0.36 D. For a triangular pattern separation is least restrictive at 5.2 t and the d is ≤1.7 t or 0.33 D. The hexagonal pattern is best when a villiform compressor is used because it contains less ribbing or strut area connecting compression points. As embedding, solder or brazing tool the triangle pattern relaxes positional tolerances but the square pattern is easiest to implement with plain square weave metal screen. These patterns tolerate compression diameters not less than pellicle thickness which militates against membrane cutting and piercing. For a matrix pattern of contiguous ribs, rib width must be ≤0.05 D or ≤0.3 t to satisfy the same 10% criterion. That is more difficult because compressors that are too narrow may cut into the membrane. That must be avoided in this invention, so contiguous line segments are not preferred.

The pattern is intended to shorten the distance electricity must travel within the membrane to reach a conduction sink where it can transfer charge to metal at negligible ohmic resistance. It is understood that prior art contact with metal can be problematic within uncompressed areas of the membrane although electrical conduction within the membrane remains active. This invention does not depend upon or require electrical contact or even attachment of the AM with the conducting surface within uncompressed areas.

Gaberscek and Ma used galvanic paste on metal backing to explore applying pressure to the electrode to improve its discharge power. Pressure applied to total electrode area for a period of time was relaxed for one hour to recover electrolyte permeation and electrical viability which did improve somewhat compared to uncompressed samples. But maintaining effective pressure over the entire electrode for continuous use is clearly not suitable. By limiting compressed area to less than 10% for an entirely different purpose, namely, electrical connection the remaining 90+% need not be sacrificed.

Figure 1:
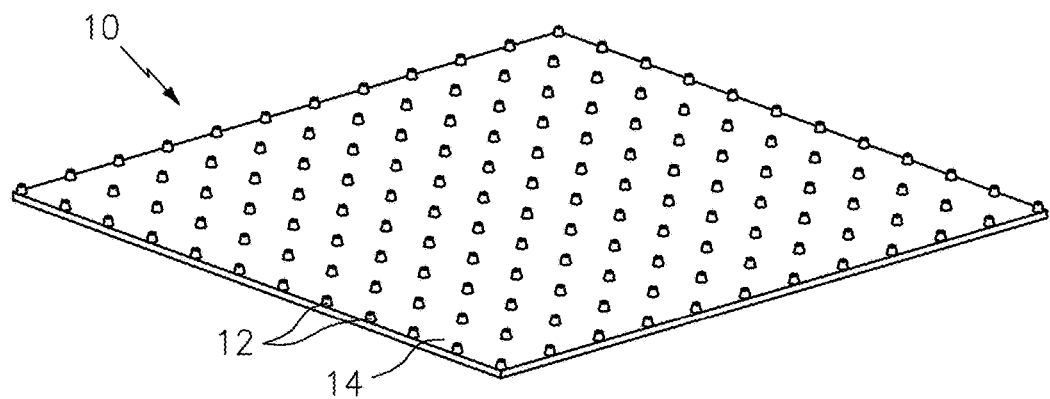
FIG. 1 shows a single-sided villiform metal plate used for a plurality of closely spaced point compression of galvanic membranes in accordance with the present invention.

Referring now to the figures, FIG. 1 illustrates a one-sided villiform metal compression plate 10 having fingerlike extensions 12 of a first surface 14, villi with distribution pattern, number, diameter, spacing and height in accordance with the specification of this invention.

Figure 2:
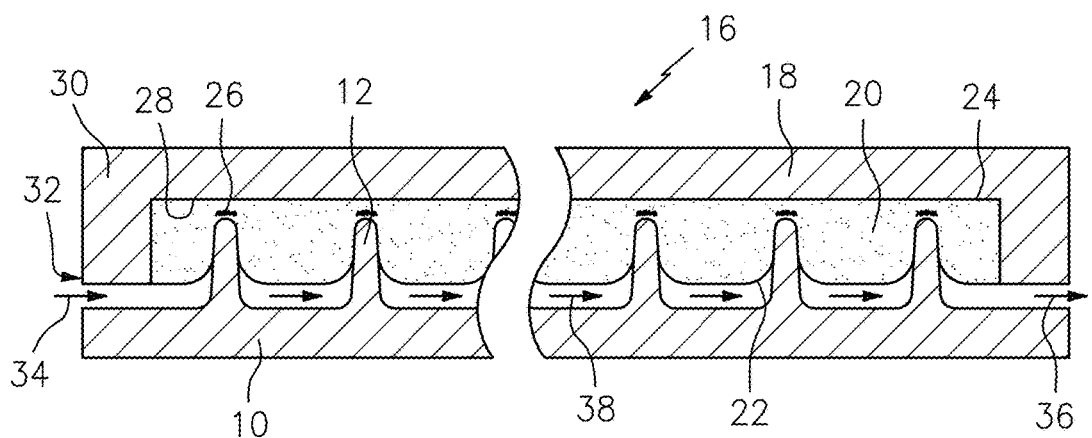
FIG. 2 shows a sectional view of metal villiform plate compression of one membrane to comprise an electrode for electrolyte flow over a galvanic membrane in accordance with the present invention.

FIG. 2 illustrates one electrode 16, comprising one of an anode or cathode 18, of a convection battery or fuel cell. The villi 12 of the one-sided villiform metal compression plate 10, adjacent a second surface of AM (active galvanic membrane) 22 adhere a first surface of AM 24 by one of; sustained compression against and brazed joint 26 onto, the first surface 28 of a smooth metal plate 30. Sustained compression or hot compression for brazing shall be not less than 7,000 kPa. Electrical resistance as measured by an ohmmeter shall be less than $10^{-6}$ $\Omega$-cm$^2$ between villiform 12 and smooth metal plate(s) 30. The edges of the three-layer sandwich are configured by extension 32 of the smooth metal plate 30 to provide entrance 34 and exit 36 ports to enable electrolyte flow 38 over the second surface 22 of the AM wherein villi 12 are approximately 10% taller than the defined AM thickness. Villi tips are tinned with brazing or solder and the sandwich is heated under pressure to form the permanent joint, cooled and then pressure withdrawn. The term tinning and tinned is used throughout in the broad sense of coating to prepare a surface for soldering or brazing to form a metal joint but does not imply using Sn. Other metals or alloys are used for low and high temperature applications.

Figure 3:
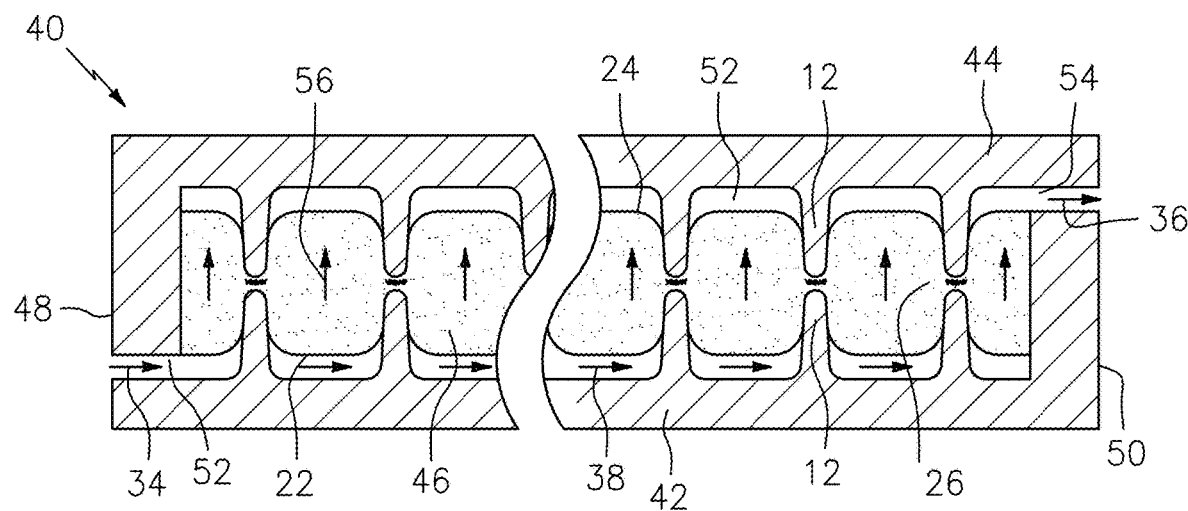
FIG. 3 shows a sectional view of metal villiform plate compression of one membrane between metal villi to comprise an electrode for normal vector electrolyte flow through a galvanic membrane in accordance with the present invention.

FIG. 3 illustrates one electrode 40, comprising one of; anode and cathode, of a convection battery or fuel cell. The villi 12 of a first one-sided villiform metal compression plate 42, are adjacent the second surface of AM 22 and villi 12 of a second one-sided villiform metal compression plate 44, are adjacent the first surface of the AM 24. Villi 12 of first and second compression plates 42, 44 are in registered opposition so as to compress the one AM 46 between every pair of opposed villi 12. The first compression plate 42 is open at a first edge first edge 48 to provide electrolyte entrance 34 at port but extended to block electrolyte exit at an opposed second edge 50. The second compression plate 44 is extended to prevent electrolyte entrance at the said first edge 48 but open via exit port 36 at the second edge 50 to electrolyte exit. All villi 12 are of substantially equal height which is approximately 10% greater than ½ defined membrane thickness dimension. 52 indicates entering electrolyte flow space, 54 indicates exiting electrolyte flow space and arrows 56 show how electrolyte convectively permeates the AM. Plates 42 and 44 are one of; held under sustained compression and durably joined by one of; brazing and solder at joints 26. Either process is hereafter referred to as joining. Sustained compression and hot compression for joining shall be not less than 7,000 kPa. Electrical resistance must be ≤$10^{-6}$ $\Omega$-cm$^2$ between metal plates.

Figure 4:
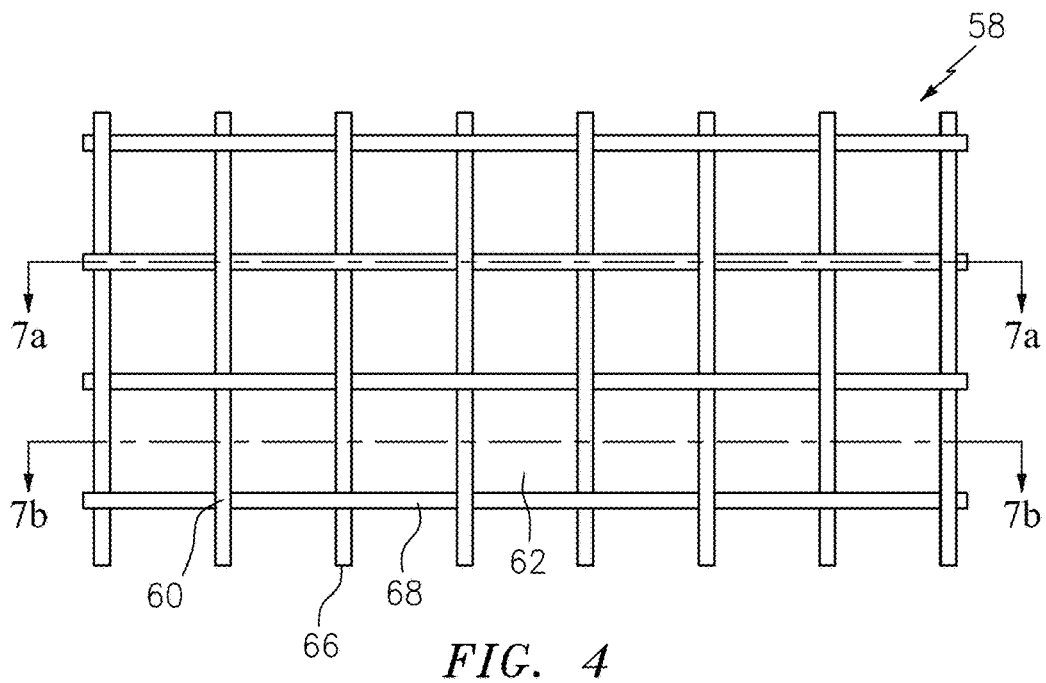
FIG. 4 is a top plan view of a square-weave metal screen segment defining a plurality of overlapping wire areas to provide closely spaced multipoint compression of a galvanic membrane and showing sectional view reference lines.

FIG. 4 shows a plain square weave metal wire (SWMW) screen fragment 58. It is 2 wire diameters thick at wire crossover points 60 and at most 1 wire diameter thick otherwise. The screen defines first and second sides by planes tangent externally to wire crossover locations and screen thickness is defined by the length dimension of a normal vector between said first and second sides. It can be seen that wire crossover locations 60 are analogous to the villi of a 2-sided villiform metal plate with open windows 62 created by wires 64 and 66 connecting simulated villi. Horizontal wires 68 and vertical wires 64 in FIG. 4 define a pattern of square sides having dimension ≤4.25 times AM thickness as required by this invention specification. It is understood that commercially available metal wire screen is very much cheaper than villiform metal plate or screen and is used here in place of villiform material as now explained.

Figure 5:
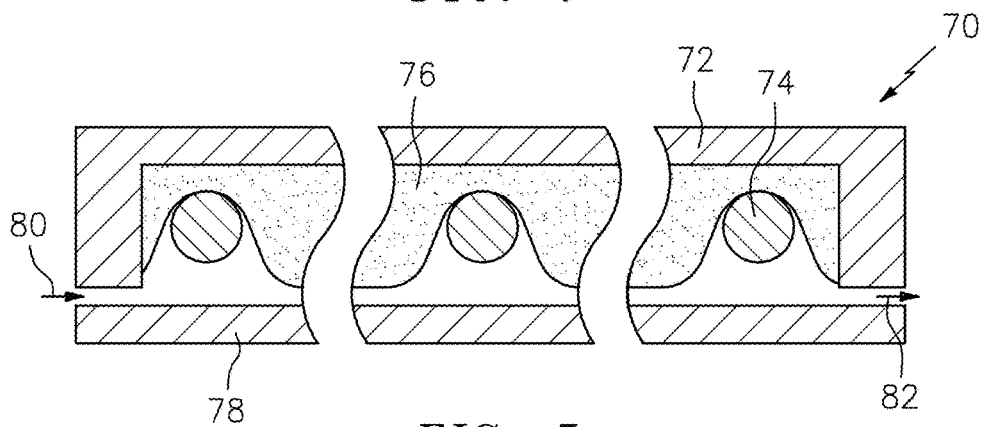
FIG. 5 shows a sectional view of metal sheet and metal wire screen compression of one membrane to comprise an electrode for electrolyte flow over a galvanic membrane in accordance with the present invention.

FIG. 5 illustrates an exemplary embodiment having one electrode 70, comprising one of; anode and cathode, of a convection battery or fuel cell. A first metal plate 72 first surface is covered by a first side of an adjacent SWMW screen 74 shown as section view B-B of FIG. 4. Wire crossovers of the SWMW screen, hidden in the FIG. 5 view, compress less than 10% of the AM 76 second surface adjacent the second side of the screen toward a first surface of a second metal plate 78 adjacent the first surface of the AM. Both edges of the second metal plate are extended to contain the AM but not so far as to close electrolyte inlet 80 and outlet 82 ports located, respectively, at first and second edges of the 4-layer assembly. Sustained or hot compression for joining shall be not less than 7,000 kPa so that measured electrical resistance is ≤$10^{-6}$ $\Omega$-cm$^2$ between metal plates. Assembly ports are configured to enable electrolyte flow over the AM second surface when the defined thickness dimension of SWMW screen is approximately 10% greater than the defined AM thickness. If SWMW screen crossover points are tinned the sandwich can be heated under pressure for joining, cooled and then pressure withdrawn.

Figure 6:
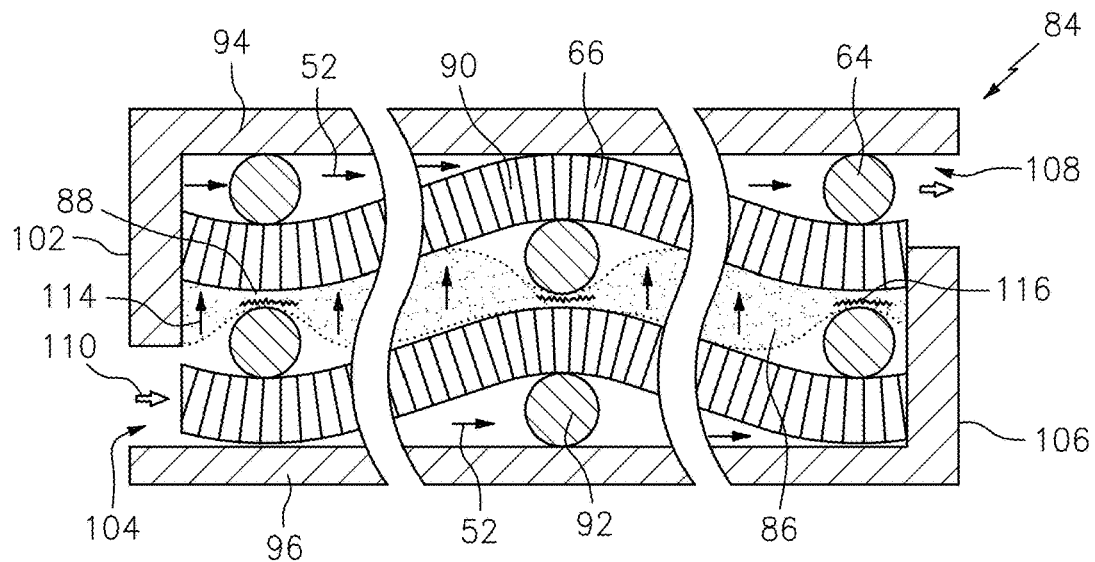
FIG. 6 shows a sectional view of metal sheet and metal wire screen compression of one membrane lodged between screens to comprise an electrode for normal vector electrolyte flow through a galvanic membrane in accordance with the present invention.

FIG. 6 illustrates another exemplary embodiment one electrode 84, comprising one of; anode and cathode, of a convection battery or fuel cell. It relates to the concept of FIG. 3 wherein one AM 86 is compressed between two SWMW screens provided screen windows are in aligned registry. An incentive for this version of the same concept comes from the inherent economy of commercial metal screen material. They are available or can be easily woven with wire made of many metals with high precision. Stainless steel, SS is most common.

The FIG. 6 exemplary embodiment uses FIG. 4 screen section A-A to describe the assembly. Wires 64 and 66 comprise crossover locations 88 and define planes tangent to first and second sides of first 90 and second 92 screens. Screen first sides are respectively adjacent first surfaces of first 94 and second 96 metal compression plates. First and second screen second sides are respectively adjacent opposite surfaces of one AM 86. First and second screen windows 62 are in registered alignment so as to compress one AM between opposed wire crossover locations 88. The first compression plate 94 is open at a first edge 102 to provide electrolyte entrance at port 104 but extended to block electrolyte exit at an opposed second edge 106. The second compression plate 96 is extended to prevent electrolyte entrance at the first edge 102 but open via port 104 at the second edge 106 to electrolyte exit 108. Wire diameters are substantially equal and approximately 10% greater than $\frac{1}{4}^{th}$ defined membrane thickness dimension in this embodiment. 110 is entering electrolyte flow, 112 indicates exiting electrolyte flow and arrows 114 show how electrolyte convectively permeates the AM 86. Metal compression plates 94, 96 are one of; held under sustained compression and durably joined at joints 116. Sustained compression and hot compression for joining shall be not less than 7,000 kPa. Electrical resistance must be $\leq 10^{-6}$ $\Omega$-cm$^2$ between metal plates.

Figures 7A, 7B:
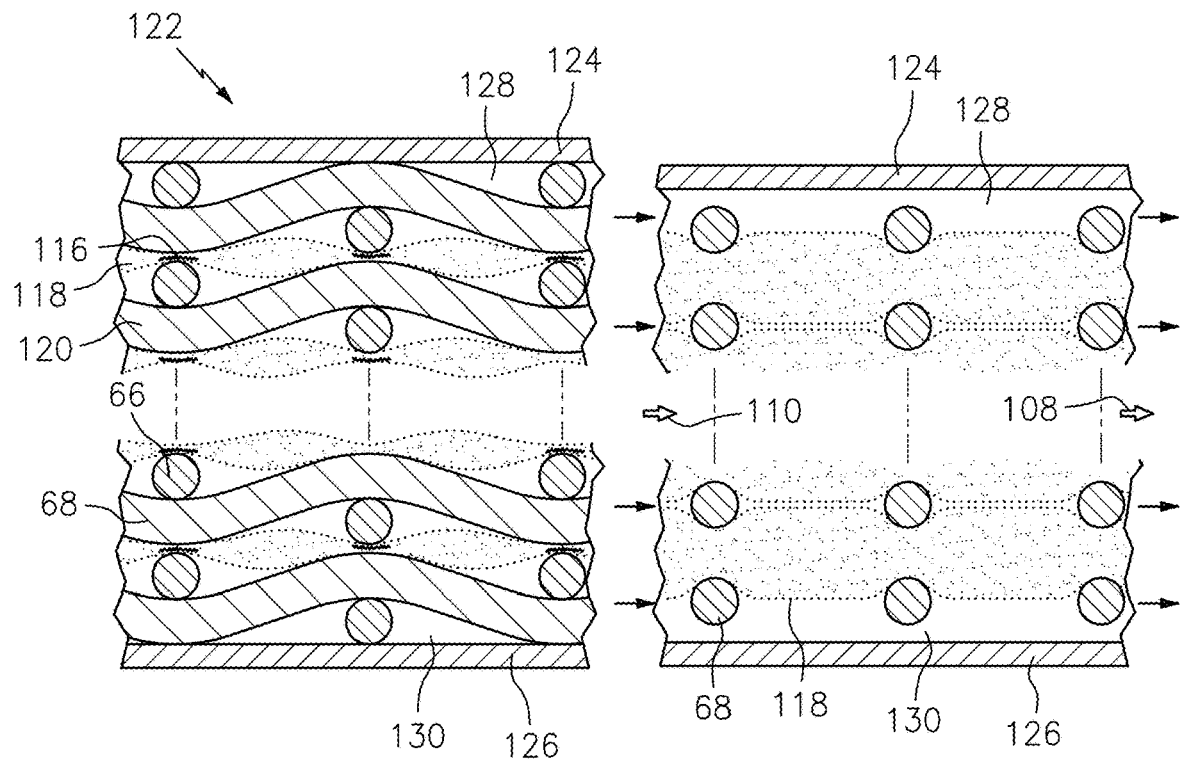
FIG. 7a shows sectional view A-A of metal sheet and metal wire screen compression of a stack of membranes and screens whereby each membrane is compressed between each screen, the stack comprising an electrode in accordance with the present invention.
FIG. 7b shows sectional view B-B of metal sheet and metal wire screen compression of a stack of membranes and screens whereby each membrane is compressed between each screen, the stack comprising an electrode in accordance with the present invention.

FIGS. 7a and 7b show another exemplary embodiment to employ the FIG. 6 concept as a repeated pattern. AM 118 and SWMW screen 120 alternate as layers in a stack 122 under collective compression between first surfaces of first 124 and second 126 plates or joined as further explained. FIG. 7a is an A-A sectional view per FIG. 4 showing compression locations comprised of wires 66 and 68 and permanent joints 116. Screens adjacent first surfaces of each compression plate do not compress an AM onto those surfaces thus leaving electrolyte flow spaces 128 and 130 empty. Screen edges have narrow openings over exposed wires at respective electrolyte entrance and exit sides of the stack to balance flow over AM exposed to edge spaces. Electrolyte flow between and over every AM in the stack from entrance on the left 110 to exit on the right 108 is shown by arrows in FIG. 7b. Every AM is compressed between screens by crossing wires for approximately one half of defined AM thickness from both first and second AM surfaces. Wire diameters and spacing are equal to within ±1 µm and are ≈10% greater than half the defined AM thickness. Windows and crossover points must match in alignment to within ±2% of wire diameter or compression will collapse the stack. It is imperative that collapse is avoided for purposes of this invention in order that one of; compression and joining can be effected.

Figure 8:
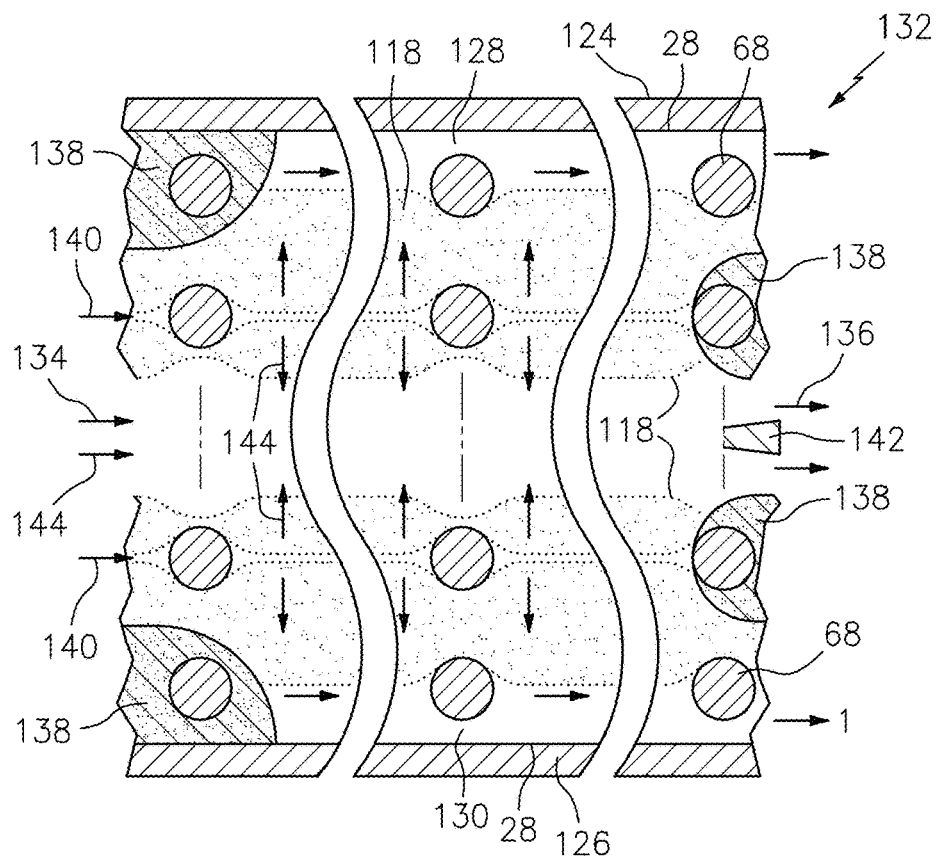
FIG. 8 shows a FIG. 7b sectional view extended and ported in accordance with FIG. 6 to comprise an electrode for normal vector electrolyte flow through all galvanic membranes in accordance with the present invention.

FIG. 8 shows another exemplary embodiment of a preferred electrode 132, comprising one of; anode and cathode, of a convection battery or fuel cell. It employs the concept of FIGS. 7a and 7b essentially for repeated AM and screen layers to build energy capacity. Side-ports for convective electrolyte entry 134 and exit 136 exist at alternating screen edges not blocked in a stack by filler 138 comprising dielectric or metal material impregnating and blocking screen windows nearest said screen edges for a distance equal to at least one screen window. This method of manifolding electrolyte flow balances convection velocity among the several open ports and is used for reasons having to do with connecting multiple cells in series for high voltage as further explained. Entry and exit pots are configured for electrolyte permeation through rather than over AM to promote faster redox chemistry, virtually nullify diffusion and to speed ion kinetics. Stacks comprise n AM layers 140 alternating with (n+1) screens where n is any positive integer. Thus, AM first surfaces face and are spaced apart from nearest AM second surfaces by a narrow gap 142 containing the mid-plane between screen thickest point tangent planes. Entry and exit ports line up with screen midplane 142 and gap 140 between AM layers. An electrolyte entry port at a screen edge must be closed at its opposite edge in the same plane. That rule forces electrolyte entering a screen layer at its defined midplane to flow through the two AM layers adjacent the said gap as shown by arrows 144 in FIG. 8.

Screens are numbered from the bottom in FIG. 8. There are two cases to consider. When n is odd there are (n+1)/2 open and the same number of closed ports on both sides of the stack so the arrangement of open and closed ports is symmetrical for flow through the electrode from either direction. If n is even there will be 1+(n/2) open ports on one side and n/2 open ports on the opposite side. The reverse applies to counting closed ports. Electrolyte flow through the electrode in either direction makes little difference. For n-even electrolyte entry from the n/2 open port side is illustrated in FIG. 8. If all ports on both sides are open, flow through the electrode is symmetrical for all n but electrolyte can only flow over AM. Diffusion within AM becomes a limiting factor. The method of screen edge blocking and selected open ports has an important function when convection electrodes are stacked in series connection for high voltage.

Figure 9:
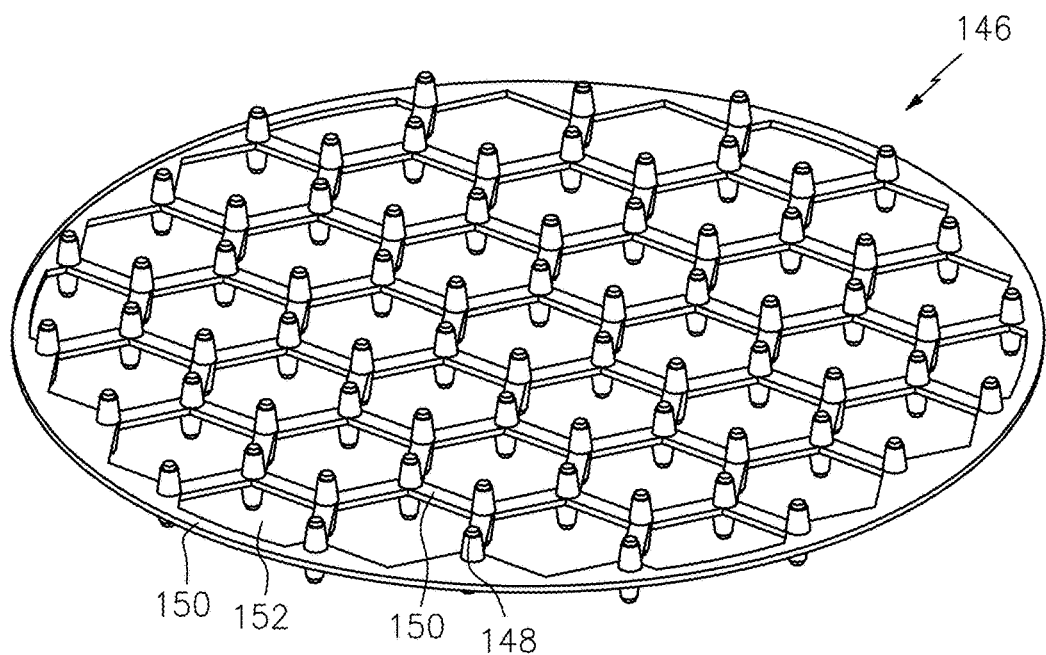
FIG. 9 is a double-sided metal villiform compression screen with hexagonal windows.

It is hard to compete with plain square weave metal wire screen for cost and simplicity but the invention should not be limited to a single compressor type or pattern. FIG. 9 is an example of a 2-sided metal villiform compressor 146 in a pattern of villi 148 with three times $t_{AM}$ (AM thickness) hexagonal spacing 150 between them to form hexagonal windows 152. Opposed villi are analogous to wire crossover locations of the woven screen. Ribs joining villi are more obstructive to electrolyte flow than wire but hexagonal screen is a valid substitute for SWMW screen.

Figure 10:
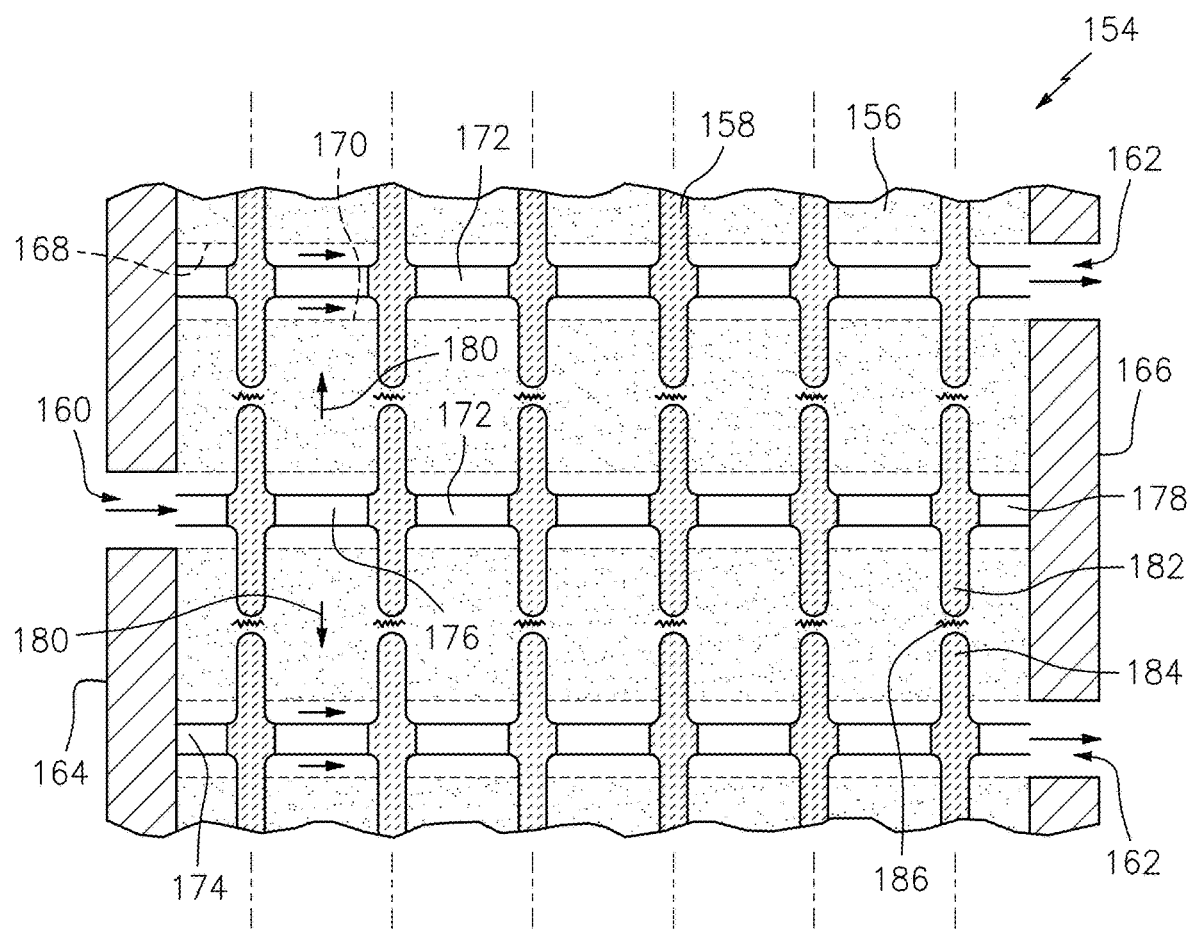
FIG. 10 shows a FIG. 8 style sectional view having square weave metal wire screens replaced by double-sided metal villiform compression screens to comprise an electrode ported for normal vector electrolyte flow through all galvanic membranes in accordance with the present invention.

FIG. 10 is another exemplary electrode 154, comprising one of; anode and cathode, of a convection battery or fuel cell functionally if not structurally identical to FIG. 8. AM 156 layers alternate with hexagonal 2-sided villiform metal screen layers 158, substituting for and taking the place of square weave metal wire screens shown in FIG. 8. Side-ports 160 and 162 are provided as openings in side-walls 164 and 166 configured for electrolyte permeation through, rather than over, AM. Stacks comprise n AM layers alternating with (n+1) screens. Thus, AM first surfaces 168 face and are spaced apart from nearest AM second surfaces 170 by a narrow gap 172 containing a midplane 174 and struts 176 connecting opposed villi. Electrolyte entry ports line up with screen midplane 174 and gap 172 between AM layers. An electrolyte entry port 160 on one side must be closed on the opposite side 178 in the same plane. Electrolyte entering through a port at a screen layer midplane on one side of the stack will be forced to flow through the two AM layers 156 adjacent the gap 172 as shown by arrows 180 in FIG. 10.

Villi 182 of one screen compress AM 156 material against the villi 184 of an adjacent villiform screen 158. Permanent joints 186 are due to hot compression of the stack in a vacuum oven using at least one of; soft solder and medium solder and hard brazing alloy at a suitable temperature for each method. The tips of the villi 184, 186 are first 'tinned' with the appropriate material well known in the brazing art. Ag—Cu, Ag—Zn, Cu—P, Ag—Cu—P and even Au—Ag or Au—Cu are useful alloys for high temperature applications and corrosion resistance. Vacuum brazing is normally carried out without flux application. Because so little material is applied to villi tips or metal wire crossover locations noble metal brazing does not add significant cost to the assembly but does provide corrosion resistance and high temperature operation of the electrode.

Figure 11:
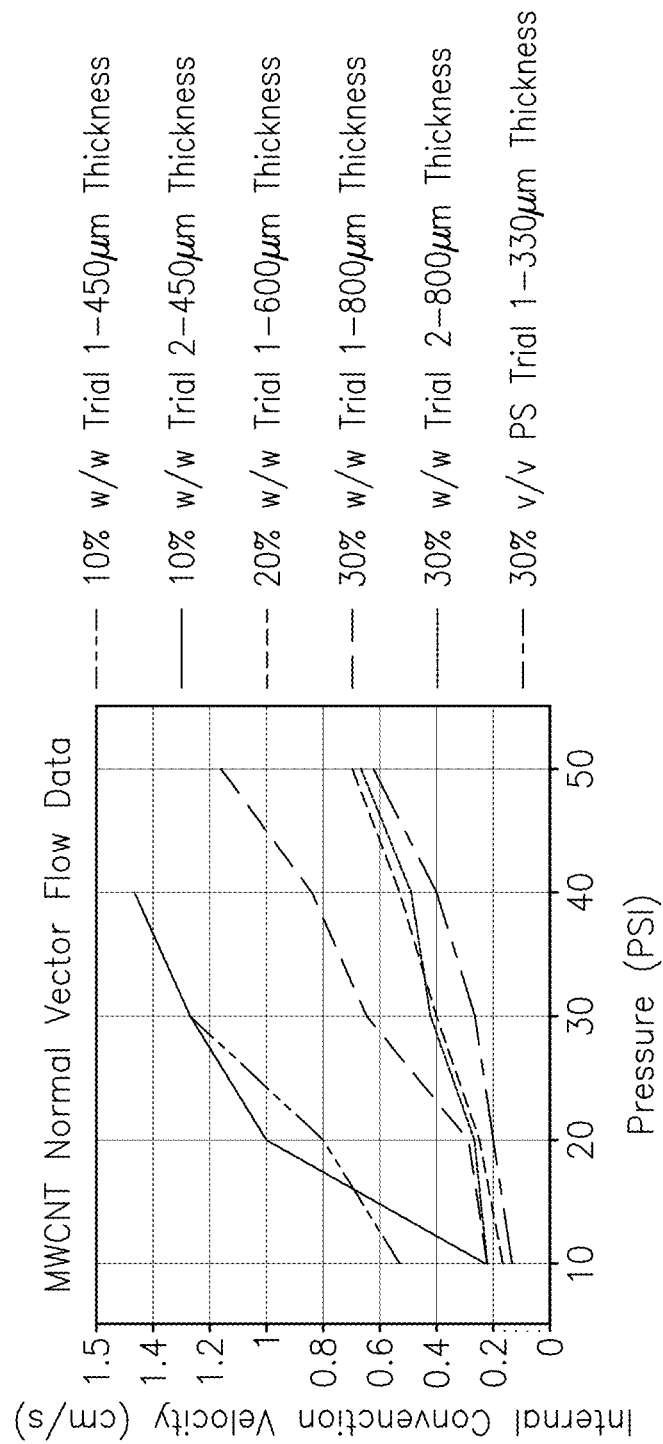
FIG. 11 shows plots of normal vector permeation through several samples of galvanic pellicles as a function of pressure. Samples purchased and made by the inventor.

FIG. 11 explains some reasons for the electrolyte convection provisions peculiar to this invention. Permeation of packed galvanic particle beds (Gordon) presents unacceptable prior art electrolyte flow resistance especially when packed with sufficient compression to improve poor electrical conductivity. Large particles can ameliorate those factors somewhat but redox activity and consequent power density suffers. FIG. 11 presents electrolyte permeation resistance for a sample of purchased and inventor made CNT membranes and AM having various porosities and containing different particle weights. It is easily seen that a stack of more than a few membranes would offer considerable flow resistance; which can be tailored for a preferred single membrane if flow is required through only one membrane at a time. Prior art packed bed permeability of less than 1 Darcy can be improved to greater than 20 Darcy in convection electrodes of the instant invention. In fact, resistance to 1 centipoise (cp) flow at 1 cm/sec through 1 $cm^3$ volume of the electrode of FIG. 8 is less than 1 psi. Ultralow electrical resistance is unaffected because that is due to closely spaced distributed multipoint compression. For the first time permeation and electrical resistance become independent variables, whereas the prior art must trade one off against the other.

Stacks are assembled with AM containing one of; anode and cathode galvanic material comprising one electrode of a unit cell battery or fuel cell. In the preferred embodiment and prior to assembly the screen crossover locations are 'tinned' for low, (battery), ≤100° C., medium, (fuel cell), ≈300° C. and high, (molten carbonate), ≈700° C. temperature applications. 'Soft' solder will do for battery screens. 'Hard' solders are suitable for medium temperature and brazing alloys are suited for high temperature joining. Tinning can be a hot roller or platen process coating only screen 'high' points. Selected screen edges are filled with tinning material. The assembly is placed in a vacuum oven and heated to appropriate temperature for melting the joint. The assembly is under pressure for a hot cycle and after cooling it can be handled without further compression. CNT and galvanic materials in common use are impervious to joining temperatures.

While the electrodes herein described are suitable for use in a variety of electrochemical cells, including fuel cells, electrolysis cells, galvanic batteries, including supercapacitors etc., it is understood that electrochemical cells are well known in the prior art, and hence no detailed electrochemical cell is included in the accompanying drawings. A suitable electrochemical cell for use of the present electrode is shown in the inventor's U.S. Pat. No. 8,283,062 at FIG. 1A in that patent. In particular, an electrode at reference numeral 34 in that patent is also shown in FIG. 1A. For purposes of efficiency and of showing use of the present electrode in an electrochemical cell, the aforesaid U.S. Pat. No. 8,283,062 is hereby incorporated herein by reference thereto for that purpose. A simplified electrochemical cell is shown in FIGS. 12, 13 and 14.

Figure 12:
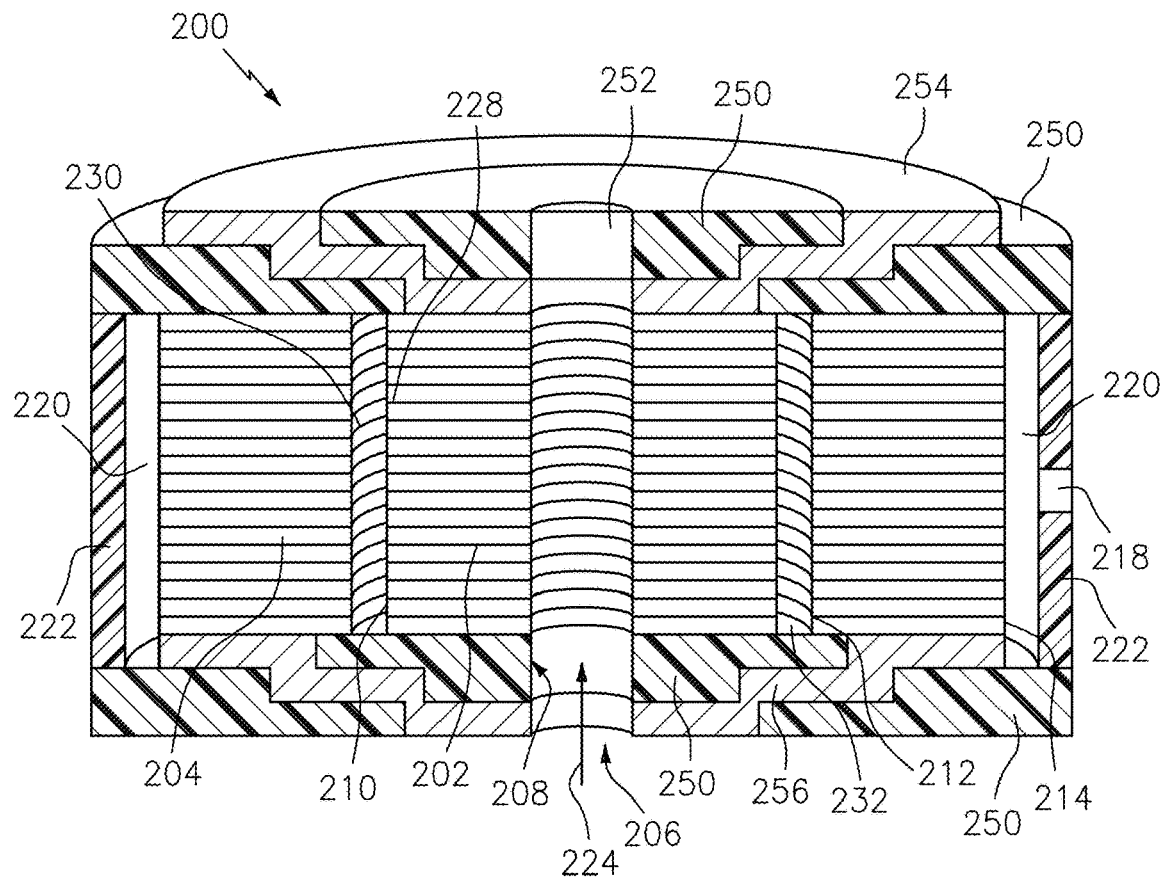
FIG. 12 is a drawing of anode and cathode annular electrodes, mutually coaxial and spaced apart, with each electrode being as described in FIG. 8, to comprise a unit cell with electrolyte convection provided by a single pumped circulation loop in accordance with the present invention.
Figure 12A:
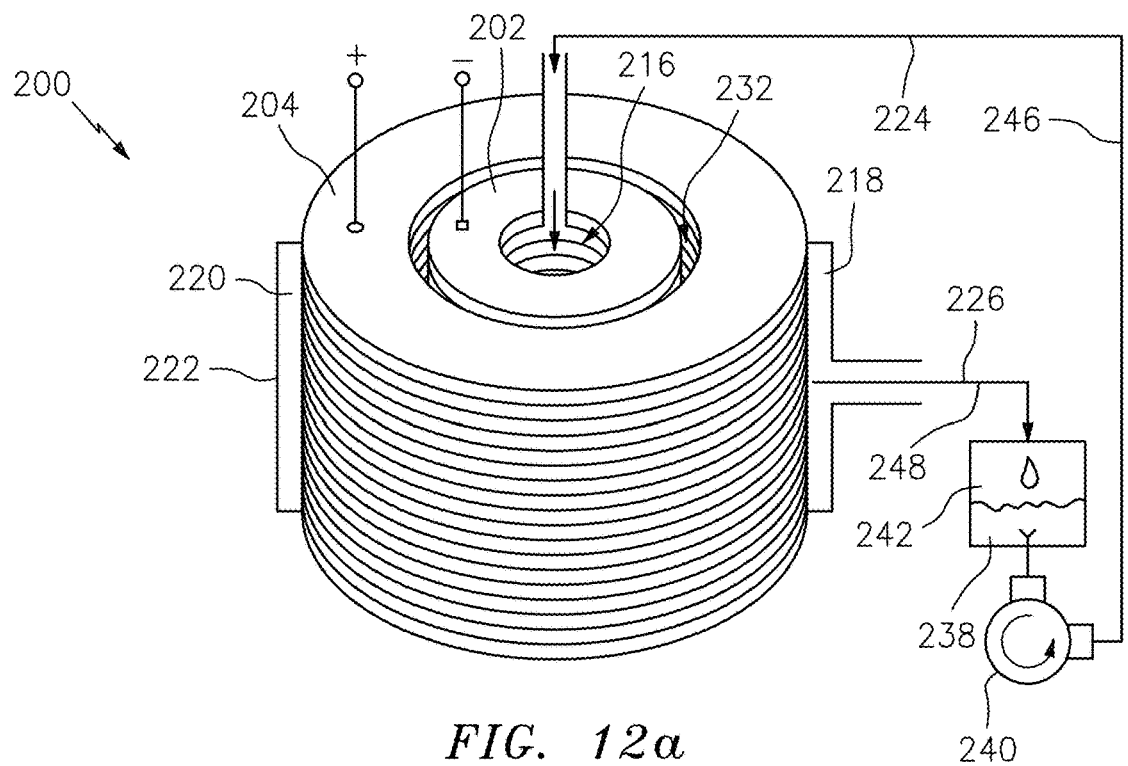
FIG. 12a is a schematic illustration of the device of FIG. 12 in a system.

Referring now to FIG. 12 and FIG. 12a (basic core) which illustrate a stack, unit cell battery or fuel cell 200 with two convection electrodes, each as hereinabove described. Both are configured for convenience of the drawings and actual use as nested concentric annular anode 202 and cathode 204 electrodes. An annulus 206 possesses the required two edges for preferred electrolyte entry through open ports at anode edge 208 followed by exit through open ports at opposite edge 210; in turn, followed by entry through open ports at cathode edge 212 and finally followed by exit through open ports at opposite edge 214. The perimeter of cathode outer edge i.e. surface can be square or rectangular for cell packaging convenience without affecting the description that follows. An anode inner lumen 216 is enclosed by the anode inner surface 208 and all anode entry ports. A cathode outer surface 214 comprising all cathode exit ports 218 cooperatively forms an electrolyte collection chamber 220 with an enclosing wall 222. The inner radius of the anode creates a lumen 216 used to contain entering electrolyte (feed flow) 224 covering the anode inner surface 208. A cathode outer chamber 220 covers the cathode outer surface 214 and is used to contain exiting electrolyte 226. The anode outer radius 228 is less than the inner radius 230 of the cathode to form a gap 232 separating spaced apart facing cylindrical surfaces comprised of the outer surface 210 of the anode and inner surface 212 of the cathode. Thus, electrolyte convection is enabled sequentially from anode lumen 216 through anode 202 and cathode 204 electrodes to cathode outer surface chamber 220. FIG. 12 is a unit cell of a single battery 200. The basic principles and claims of the invention are not altered if either electrolyte flow direction or positions of anode and cathode, i.e. labels and polarity are reversed.

Electrolyte 238 is delivered to the central lumen 216 of the annular anode structure. A pump 240 and accumulator 242 containing gas is required in the electrolyte circulation loop 246. The main purpose of a gas accumulator 242 is to absorb AM volume changes in battery cores due to charge/discharge cycling and product gas from fuel cells. It allows continuous electrolyte conditioning and draining of electrolyte 238 from a battery 200 to prevent self-discharge needed for long shelf-life. Circulation 248 is generally into and through the anode 202 followed by circulation through the cathode 204 to maximize cathode redox chemical activity. Gas in the accumulator breaks the self-discharge electrolyte pathway in a unit-cell 200. Dielectric insulation plates 250 partially enclose the axial ends of the anode 202 and cathode 204. A dielectric plug 252 is insertable in the end of the lumen 216 to cap the lumen 216. A metal terminal 254 is electrically connected to the anode 202 at an end of the unit cell 200. A metal terminal 256 is electrically connected to the cathode 204 at an opposite end of the unit cell 200. The metal terminals 254, 256 can conduct electricity from the unit cell 200 to another unit cell 200 or as part of an electrical circuit.

Figure 13:
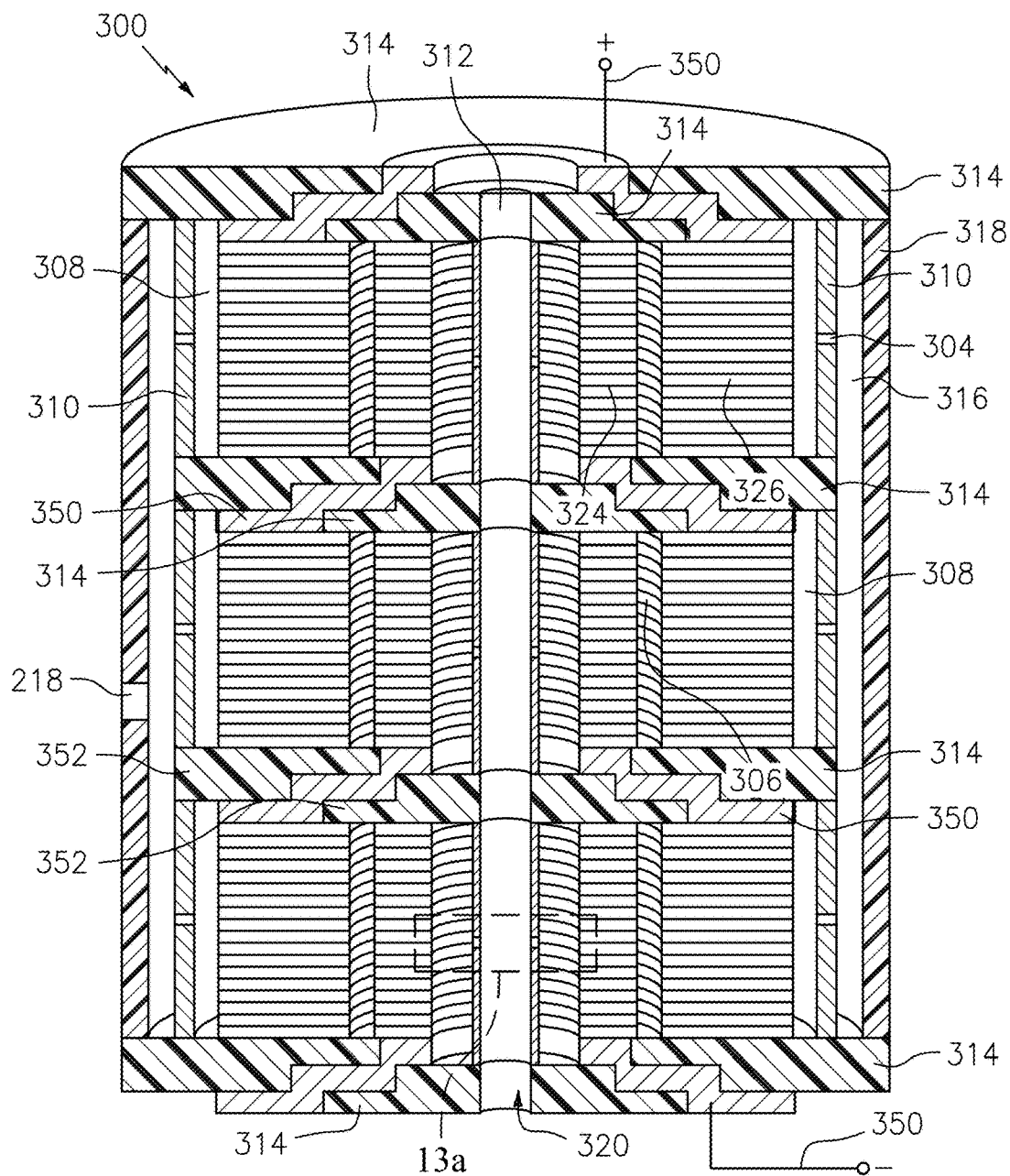
FIG. 13 is a drawing of a stack of shielded anode and cathode annular electrodes in accordance with the present invention where each unit cell pair repeats FIG. 12 as series connected to the next through separating plates to accumulate voltage. Electrolyte convection is provided by a single pumped circulation loop.
Figure 14:
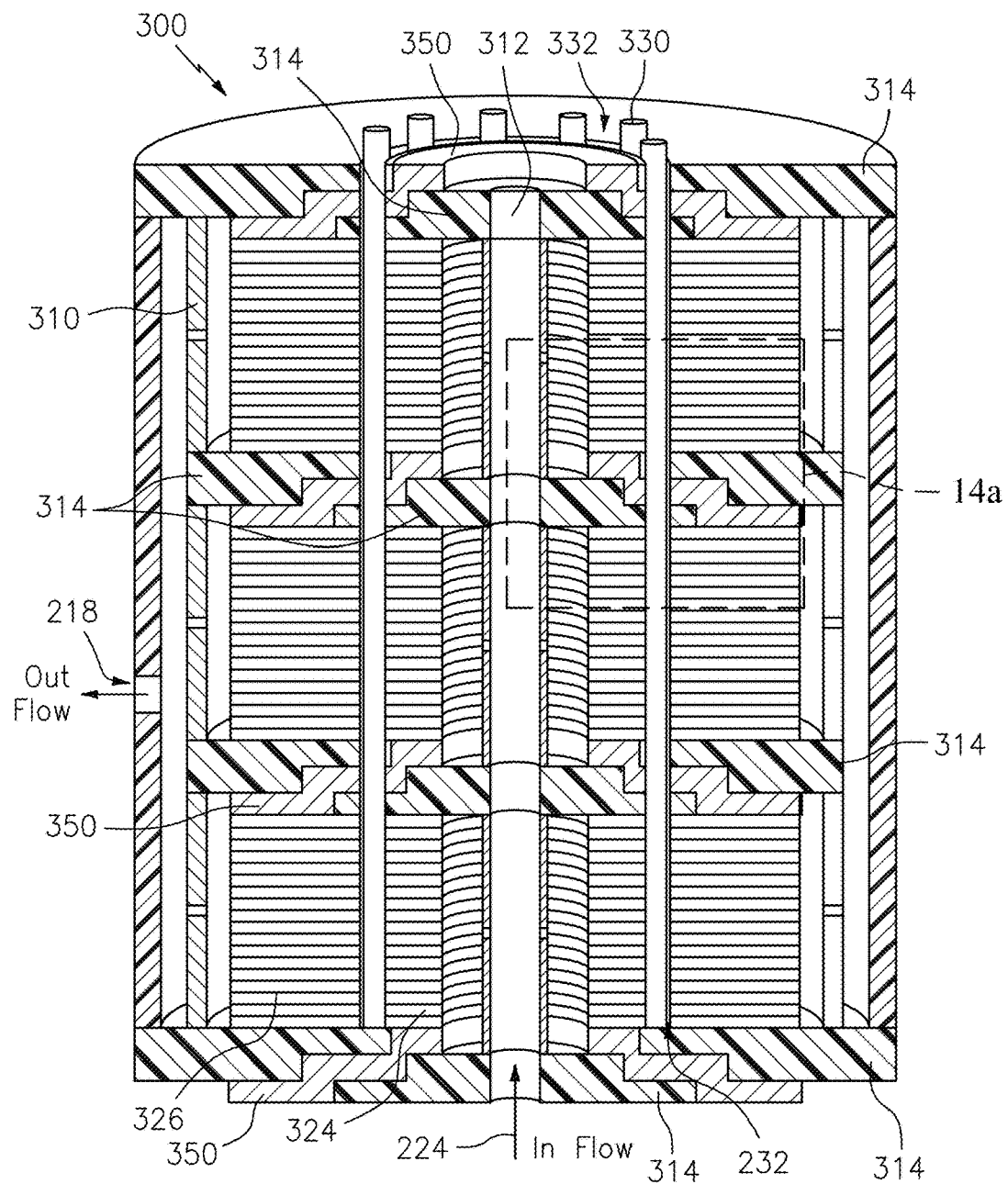
FIG. 14 is a drawing of a stack of shielded anode and cathode annular electrodes in accordance with the present invention, repeating FIG. 13 with added oxygen bearing gas sparger in the gap between electrodes. Electrolyte convection is provided by a single pumped circulation loop.

In another exemplary embodiment, inner chambers enclose, isolate and separate multiple common polarity electrode surfaces arranged in a stack for series connection and high voltage as shown in FIG. 13 and magnified section 13a. The stack comprises repeated versions of FIG. 12 separated by a conductive metal plate 350 containing metal connecting the lower anode to the next upper cathode and dielectric insulation 352 that insulates all cathodes from one another and all anodes from one another. All anodes remain inner annular electrodes so all cathodes are outer annular electrodes. The arrangement permits a single electrolyte circulation loop serving all electrodes and unit cells in the stack. It is a major simplification of a classic problem not solved in prior art.

Figure 13A:
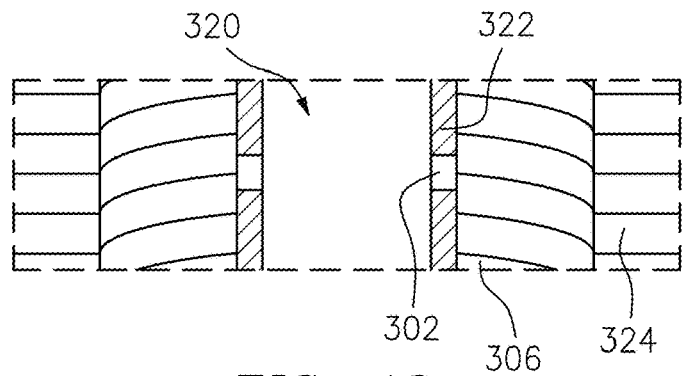
FIG. 13a is a magnified view of a segment of the anode central lumen shown in FIG. 13.

The isolating and separating inner chambers of the cathodes and anodes and the collective outer chamber of the cathodes and lumen serving anodes comprise double chambers over every electrode. These double chambers have a specific novel purpose as further explained. FIG. 13 shows one of; a single and plurality of small holes in the wall separating inner chambers from outer chambers. FIG. 13a is a magnified view of a segment of the anode central lumen for clarity. Electrolyte passing between inner and outer chambers must do so through and within these holes at convective velocity greater than 1 cm/sec. This feature has no purpose for a single unit cell shown in FIG. 12 but is of vital importance to connecting multiple unit cells in series for high voltage as hereinafter further explained. The circulation loop in FIG. 13 moves electrolyte from outer cathode chamber to anode lumen. A facility for one pump and circulation loop connecting multiple battery/fuel-cell unit cells in series for high voltage is novel in this invention. The connection profile is not unique except for how convection is enabled.

In U.S. Pat. No. 8,911,893 B2 to Suppes electrolyte flows through successive anode and cathode electrodes but is ineligible to enter the next series connected cell because polar orientation of the connecting electrolyte path becomes a battery in reverse. Convection makes matters worse by aiding reverse ion exchange between electrodes of adjacent cells. One could arrange a single pump and reservoir to receive electrolyte from a bank of anodes and pump into a bank of cathodes with the cells connected electrically in series. It will be seen that, for example, a next in line cathode is actually connected to the anode facing the previous cathode and that is reverse polarization through the gang of conduits serving all cathodes. Essentially successive electrodes having the same ostensible polarity are actually at progressively higher potentials and will discharge through any common electrolyte pathway which contributes to self-discharge.

Prior art alkali fuel cells are more efficient than acid and use non-noble metal catalyst at 250 degrees C. to 300 degrees C. which also dissolves carbonates to keep precipitate from clogging electrodes in some popular fuel cells. Common design uses a more open matrix that allows electrolyte flow between electrodes (parallel to the electrodes) or through the electrodes in a transverse direction to collect reaction products that are processed in a reservoir. None of these popular systems can be connected in series absent elaborate electrolyte circulation and processing systems.

FIG. 13 illustrates stacking unit cells connected for increasing voltage of the composite cell 300. It incorporates electrodes of FIG. 8 containing inlet 302 and outlet 304 ports on exposed electrode stack surfaces comprising a flow manifold 322 for convective electrolyte. As a way of clarifying the problem with prior art series connection of convective cells suppose the stack of cathodes were exposed to a common pool of electrolyte in a chamber fitted for pumped circulation. Even though all cathodes are insulated from one another they exist at progressively higher potentials. The uppermost cathode is electrically connected to an anode which exerts considerable voltage on the electrolyte pool between the lowest cathode and the next to highest anode. It is like connecting the terminals of a high voltage battery to a pool of electrolyte. The battery will discharge by polarizing the pool of electrolyte. Every cathode is between two electrolyte loops; 1) the one it is supposed to see and 2) the one that opposes the intended electrical current. The same can be said for all anodes.

The primary electrolyte loop is aided by convection as intended. The parasitic loop depends on slower diffusion but is not insignificant. Inner electrode chambers 306 and 308 are adjacent and fully enclose, respectively the inner anode and outer cathode surfaces where electrolyte either enters or exits electrodes as shown in FIG. 8. Electrolyte covering these respective electrode surfaces is fully isolated and shielded by metal walls 310 that comprise the respective inner chambers. The metal walls 310 are insulated from electrodes by a dielectric plug 312 and dielectric supports 314. No anode can 'see' another anode through an electrolyte pathway except through small holes in inner chamber walls. The same is true for cathodes so most of the electric field is blocked by the metal walls. Assuming the electric field in holes is a pathway for an ionic diffusion current opposing the one that contributes to a cell's purposeful current; that ion current is opposed by an electrolyte convection velocity of 1 cm/sec; understood to be $10^3$ times faster than diffusion in most known electrolytes. Ion kinetics within holes is dominated by convection rather than diffusion so reverse ion current (polarization) cannot actually complete a circuit to generate a back emf. Outer chamber 316 formed by a wall 318 extending the full length of the multi-unit cell stack and the FIGS. 13 and 13a central lumen 320 contains the electrolyte pool that communicates with the circulation pumping system. The common electrolyte pools are virtually completely isolated from electrodes.

Flow between anode 324 and cathode 326 is entirely reversible for batteries and there may be a benefit for doing it for certain paired redox faradaics undergoing charge/discharge cycling. For fuel cells the focus is on a single flow path from anode through cathode and back to anode. One flow path is easier to control as compared to the several flow paths required in prior art mobile electrolyte fuel cells. Fuel, preferably in gaseous form at high (300° C.) temperature and (100 psi) pressure is mixed with alkali (e.g. 80% KOH) preferably to produce a foam mixture in any of a number of methods known in the art. Fuel saturated menisci will react favorably and quickly on catalyst surfaces within the anode to produce a surfeit concentration of cations somewhat diluted by additional water. These will be $K^+$ given the preferred choice of alkali electrolyte. In prior art fuel cells $K^+$ is ineligible to pass through an electrode separating membrane. No such membrane is used here so flowing electrolyte is free to carry the ion to the cathode. There is good reason to elect this paradigm. Cathode oxygen reduction chemistry, ORR is normally much slower than fuel oxidation in prior art. Here, excess cation concentration in the electrolyte covering ORR catalyst surfaces promotes $O^-$ adsorption on catalyst surfaces in keeping with accepted chemical reaction kinetics. The key to virtually 100% Direct Oxidation Fuel Cells, DOFC without requiring hydrogen reformulation is now explained for the first time regarding fuel cell technology.

Figure 14A:
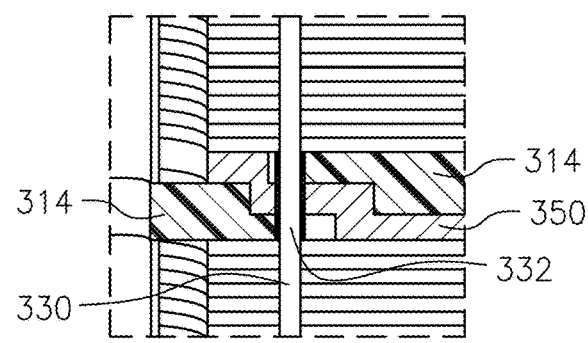
FIG. 14a is a magnified section of sparger penetration of separating plates.

The anode 324 of this invention can be made large enough and with a high enough concentration of any suitable catalyst at high temperature to achieve nearly complete >95% fuel oxidation. >99% is theoretically possible but such low concentration of fuel that might otherwise poison ORR catalyst was proven tolerated in most cases. Here, even residual fuel will be oxidized away before it can reach the cathode. FIG. 14 shows dielectric (e.g. glass or ceramic) tubes 330 bearing oxygen passing through a sealed hole 332 in the plate. FIG. 14a is a magnified section of the gap 232 and metal unit-cell separator plate (metal terminal) 350. Pure $O_2$ or $O_2$ in gas under pressure fills the tube which comprises a gas sparger within the gap. The walls of the tube either contain holes communicating between gas and electrolyte surrounding the tube or the tube walls comprise a porous dielectric frit that passes gas under pressure through the walls of the tube. Gas passing into electrolyte within the gap will create a foam-like mixture of $O_2$ bearing gas, residual fuel and product gas from the anode and electrolyte under convective pressure to enter the cathode. Any residual fuel mixed with $O_2$ gas will be quickly oxidized under pressure at 300° C. Because the tubes passing between unit-cells contain only gas and are dielectric, short circuit through electrolyte is not possible.

The galvanic membrane, AM (20, 46, 76, 86, 156) shown in FIGS. 2-3, 5-8 and 10 may include at least one of; a cohesive mat 340 of nonwoven single-walled carbon nanotubes, FIG. 18; a cohesive mat 340 of nonwoven multi-walled carbon nanotubes; a plurality of layers of graphene sheets (not shown); single and multi-walled carbon nanotubes grown on woven carbon fiber 342 and combinations thereof being one of; coated with nanoscale active galvanic material and containing lodged and immobilized nanoscale active galvanic particles, FIG. 19.

FIG. 16 is a chart of bulk resistivity, ohm-m in the plane of sample galvanic membranes made in house and purchased commercially. Experimentally measured data is essential to a calculation of net electrode resistance using material in accordance with the invention. It cannot be inferred from known conductivity data respecting components, e.g. CNT or graphene that comprise the membrane due to complexity of composite structures.

Evanoff, *Ultra Strong Silicon-Coated Carbon Nanotube Nonwoven Fabric as a Multifunctional Lithium-Ion Battery Anode*. American Chemical Society vol. 6, NO. 11, (Oct. 17, 2012) 9837-9845, used nonwoven CNT (also used in this invention) to make galvanic membrane electrodes; specifically anodes with the suggestion that cathodes could be made in similar fashion. It is proposed that electrical connection can be made at the edge of the membrane as conductivity in the plane of the membrane allegedly mimics that of the CNT fibers which is twice that of silver metal.

FIG. 16 shows that not to be a valid premise. Electrical conduction along CNT fiber length is indeed very high but not through its wall. Randomly oriented and tangled fibers as obtains in nonwoven 'buckypaper' limit charge transfer conductivity to all but fibers longer than the area dimension of the membrane as proven by the data of FIG. 16. Conductivity can only be high between points closer than fiber length. In this invention unbroken fiber length is several times membrane thickness. For any galvanic membrane of appreciable area and power capability connection at its edge suffers from high electrical resistance in the plane of the sheet. Graphene is known for its high conductivity but multilayer graphene required for substantial energy storage capacity suffers too many defects for that conductivity to be realized over long distances. A single defect anywhere in a CNT fiber or graphene sheet is like a break in a metal wire.

Electrical conductivity along CNT fiber or in the plane of graphene sheet is twice that of silver metal or ≈$10^6$ Siemen/cm but it must be remembered that a single graphene sheet or several sheets is very thin as is a galvanic membrane so lateral conduction in the plane of the sheet has very little cross section for conducting electricity. As a practical matter when one assembles a substantial mass of nanoscale graphene sheet or CNT, woven and nonwoven to comprise a galvanic membrane, lateral bulk resistance within the membrane is ≈$10^{-2}$ ohm-cm as shown in FIG. 16 to report actual experimental data. The reason for 4 orders of magnitude higher resistance is the accumulation of imperfections in graphene structure over extended distance. It simply does not have continuity in its conduction path as is common in metal. Prior art paste coating using carbon powder is normally in the range of 50 to 100 μm thick whereas galvanic membranes of this invention will be ≈50 μm to 1 mm in thickness. Unperturbed CNT fiber length of, or graphene sheet imperfections separated by, at least 3 mm comprise 15% to 50% of material used to make active porous galvanic membranes, AM of 1 mm or less thickness in this invention. The material is commercially available and will assure that a point furthest from its nearest compression is electrically connected to an electrical sink as now further described.

Tensile strength of a short length of continuous CNT fiber or graphene absent defects is higher than any other material at 130 GPa and both are supremely flexible. A removable brazing tool or multipoint compressor will force the AM comprising these materials onto the metal surface without cutting the material if compressors do not have sharp points, corners or edges. A continuous uninterrupted graphene electrical conduction path is established from a farthest point of active galvanic chemistry to a conduction sink in low resistance contact with the metal. It is understood that CNT is graphene rolled into a tube.

Figure 15:
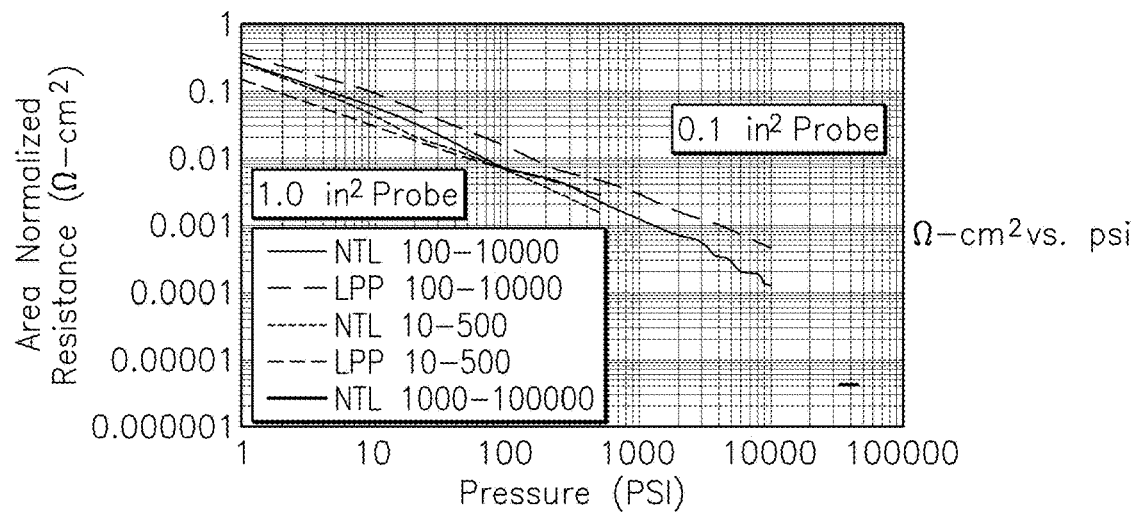
FIG. 15 is data to support the essence of the invention based upon the novel discovery that localized pressure in excess of $10^4$ psi is required to reduce resistance through a galvanic membrane and into a metal current collector to less than $10^{-6}$ ohm.

The invention's operative criterion specifies resistance rather than pressure because it is about electrode architecture dedicated to achieving ultralow resistance by application of sustained pressure on or by joining onto a conducting, e.g. metal surface of a plurality of small areas of an AM. Experimental data is plotted in FIG. 15 showing the relationship of ohmic resistance normalized to 1 $cm^2$ electrode area as a function of static applied pressure. A number of samples of galvanic membrane comprising graphene structures as above described, both purchased and made by the inventor, were tested. Using probes of an ohm-meter it is very easy to measure resistance between a membrane's compressed outer surface and the metal backing. When pressure within the compressed area reaches 7×$10^3$ Newton/$cm^2$ resistance falls to less than $10^{-5}$ ohm (10 μΩ) for all test samples. The value is central to the purpose of this invention, namely to reduce effective electrode resistance respecting prior art by at least three orders of magnitude.

When the effective contact resistance between small uncompressed area portions of the membrane and porous metal backing becomes negligible, i.e. less than 10 μΩ for current flowing through compressed membrane portions from within uncompressed portions, such current sees only operative bulk resistance along a short path to the electrical conduction sink. U.S. Pat. No. 9,337,474 by this inventor used spread function analysis to compute that resistance which is in parallel to all similarly situated portions. Experimentally measured bulk resistivity of FIG. 16 was used in the calculation although that may be less as the quality of graphene improves with further development to reduce defects in its structure.

It is clear that, using presently available materials the method of this invention reduces net electrode resistance with respect to 1 $cm^2$ of electrode area to $10^{-4}$ or at most $10^{-3}$ ohm-$cm^2$. That is more than three orders of magnitude less than prior art values of ½ to 10 ohm-$cm^2$. The importance of such low resistance in electrodes for electrochemical cells is apparent to those skilled in the art and further reduction may not be as compelling.

FIG. 15 provides resistance data measured between the outer surface of sample galvanic membranes and the metal support surface normalized to electrode area as a function of pressure. Copper probes of various sizes were used with a sensitive ohmmeter and the membrane compressed over a large range of pressure. 1 psi, is the approximate pressure normally applied to the entire membrane or paste in a prior art assembly. Resistance is consistently about ½ to ¼ ohm-$cm^2$. At 7,000 Newton/$cm^2$, resistance in all samples was less than 10 μΩ. Ohmmeter sensitivity was unreliable below that value but it became clear that higher pressure would reduce contact resistance to short circuit values.

Compression and joining are only means to the object of the invention which is to create a plurality of closely spaced apart locations in the galvanic membrane where it has contact resistance to metal backing of less than 10 μΩ while leaving the remainder of the membrane undisturbed respecting its electrochemical properties and activity. To practice the invention an ohmmeter with probes is used to measure resistance at any point within any one of the plurality of local conduction sinks distributed on the membrane area, the compressed areas comprising a collective area that subtracts less than 10% from the membrane's electrochemically active area.

Pressure and joining can produce the required local contact resistance between the outer membrane surface and a conducting surface with further utility as now explained. Sassin, Wang and Evanoff showed faradaic materials being lodged and immobilized in strongly coupled coatings on the surfaces of graphene galvanic structures to comprise electrodes. Those methods are used in this invention to make porous galvanic active membranes, AM. Ma had to use prior art paste formulations with binders and covering membranes to test high energy capacity cathode particles in Li-ion battery electrodes as the only way to stabilize them. The method described in this invention for securely attaching AM to a conducting surface to form a galvanic pellicle on that surface has the added benefit of immobilizing particles otherwise lodged and distributed within the membrane.

Notice should be taken of the fact that pressure of 7,000 Newton/cm$^2$ within the compressed area is generally sufficient to lower bulk plus contact resistance to less than 10 micro-ohm-cm$^2$. This pressure is created at all compressed areas when applied pressure over the membrane as a whole is only 700 Newton/cm$^2$ because less than 10% of the area is compressed. If only 5% of the area is compressed the pressure multiplier is 20 to 1.

Figure 17:
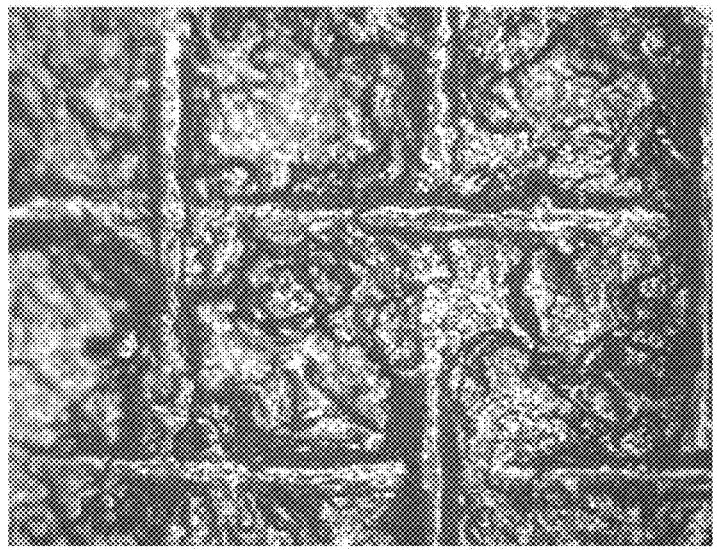
FIG. 17 is a microphotograph of the imprint made in a galvanic membrane by a square weave metal screen after the pellicle was removed from an electrode.

FIG. 17 is a microphotograph of a membrane removed from an electrode bearing a 100 mesh plain metal screen imprint. There was no penetration or cutting of the membrane upon removal. When all criteria for plain wire screen parameters are considered in accordance with specifications of this invention, including square weave mesh spacing of 4.25 times AM thickness, ratio of wire arc to chord length and diameter to AM thickness, it is computed that wire takes 9% of electrode volume. Allowing 5% for flow only 14% of the electrode core is allocated to volume other than AM. Compression area is only ≈2% of AM area. Mesh, M is commonly expressed in wires per inch. 1/4.25 $t_{AM}$ for 100 μm thick membrane is standard 60 Mesh and 2.1 mil wire diameter. Comparing energy density of the AM electrode to popular PTFE/carbon powder faradaic versions, active material mass is not very different in AM or adhesive coatings on metal; nor is the amount of metal used per electrode. A significant difference is due to the absence of a separating membrane in the AM convection electrode while prior art batteries contain at least one 50 μm membrane in an electrode having a 50 to 100 μm active coating. That can cut energy storage density by $\frac{1}{3}^{rd}$ to ½ compared to AM electrodes of this invention.

The FIG. 17 microphotograph of a membrane portion removed from an electrode after being compressed by SS screen reveals an intact membrane suffering no penetrations or cutting. Wrinkling of the uncompressed portions occurs upon removal from the electrode metal backing as the membrane dries. The wire cross points apply enough pressure to virtually eliminate contact resistance at those locations whereas between those locations the pellicle has and needs little, if any, electrical contact with the metal. Between compression points it can come completely off the metal backing but it remains uncompressed and electrochemically active. It has room (volume) to expand and contract with impunity. Yet, resistance between pellicle as a whole and supporting metal remains more than three orders of magnitude lower than conventional assemblies because distance between compression points is short and material bulk resistance is low.

The imprint was made by the square weave metal screen in a galvanic pellicle which was removed from an electrode. Uncompressed areas wrinkle as they dry but the sample shows no penetrations or cuts within compressed areas. Applied pressure exceeded 7,000 Newton/cm$^2$.

FIG. 18 is a SEM photo of a nonwoven CNT membrane and FIG. 19 is such a membrane showing typical galvanic (catalyst or faradaic) particles with approximately 1 μm enclosing spherical diameter entrained by web-like strands of CNT. These particles wash out of the membrane when permeated by 1 cm/sec convective electrolyte flow if membranes are merely adjacent porous metal support but become stably lodged and immobilized under the same convective flow when the membrane is compressed onto or embedded into the metal as specified and described herein.

Stretched graphene and CNT surfaces compress the particle/electrolyte interface, further reducing charge transfer resistance. Also the prior art requirement of a solid covering ion permeable but restrictive membrane to retain otherwise unstable galvanic materials within a paste coating is removed.

FIG. 11 is an AM (galvanically active membrane) permeability data used in part to test particle stability reported for samples such as depicted in FIG. 19. Samples were tested both as laid upon porous metal backing with negligible applied pressure and secured as required by this invention Similar samples, some containing particles and some not, were laid upon a porous metal backing and electrolyte forced to flow through both galvanic pellicle and metal. FIG. 11 shows various rates of permeability based upon formulations of the CNT suspensions for that specific purpose. The discovery, not known heretofore, is that particles wash out of a membrane as expected when it is not secured to the porous metal backing as specified in this invention to lower electrical resistance. But if secured by a plurality of closely spaced compressed or joined areas as described in and required by this invention, the particles did not wash out even under convective flow of 1 cm/sec. Electrolyte flow permeated a particle containing membrane secured to the conducting surface, which can be solid or porous, in accordance with the invention as described above and the particles remained lodged and immobilized within the membrane, i.e. electrolyte ran clear. It is thus proven and claimed that porous galvanic active membranes of this invention can contain and immobilize particles having enclosing spherical diameter dimension of 0.5 to 10 μm in addition to strongly coupled coatings on graphene surfaces to serve as stable galvanic material in ultralow resistance electrodes employing convective mobile electrolyte.

An important additional feature of the disclosed electrodes is temperature tolerance for use in fuel cells due to the previously mentioned absence of a separating permeable dielectric membrane or adhesive pastes.

The disclosed electrodes are the only electrodes that fully and permanently lodge and immobilize all galvanic materials, including particles that pastes cannot secure, within electrically conducting membranes. These materials are catalysts in the case of fuel cells. Secondary battery membranes must contain fluid electrolyte. Fuel cell electrode membranes support higher current density if they are also easily permeable to electrolyte convection. As CNT, temperature tolerance exceeds >700° C. and will be suitable in high temperature fuel cells including molten carbonate. Ni and Ni stabilized with YSZ as anode particles and $MnO_2$ ($O_2$ reduction) catalyst at higher temperatures are as active and effective as noble metal catalysts usable but not required in this invention. This and absence of membranes separating electrodes will greatly reduce the cost of fuel cell technology.

It is a purpose of this invention to reduce real axis resistance (e.g., Nyquist plots) by several orders of magnitude respecting previously achieved levels.

The invention provides a better way to reduce resistance and increase current density, especially for faster charging.

The invention provides high capacitance and series voltage design freedom to achieve a substantial increase in both energy and power density.

Fuel cell electrodes in this invention will benefit from a combination of energy and power density improvements due to negligible ohmic resistance, the absence of an ion selective semipermeable membrane and electrolyte convection newly possible in combination with compact high voltage.

Area current density using electrodes of this invention in fuel cells is limited only by catalyst concentration and temperature at which they operate which is much higher than possible in the presence of ion selective separating membranes required in conventional electrodes.

The inventor has succeeded in reducing electrode ohmic resistance to less than 1 $m\Omega$-$cm^2$ which clearly translates into the possibility of very much higher voltage, current density and concomitant power in electrochemical cells. Data presenting bulk plus contact resistance as a function of applied normal pressure on CNT pellicles is shown in FIG. 15. 1 psi is the typical assembly pressure in a conventional winding or stack and corresponds to most reported values.

The essential elements and principles of the invention can be summarized as follows: They define an electrode for electrochemical cells; the electrode comprising an electrically conductive porous surface and an electrically conductive porous membrane having a first surface and an opposed outer second surface separated from the first surface by a thickness dimension defined by the length of a vector normal to the first surface and extending to where it intersects the opposed outer second surface within an uncompressed portion of membrane and wherein; portions of membrane first and second surfaces are compressed between porous metal surfaces. Definitive controlling conditions are that not more than 10% of the membrane's surface area shall be one of; compressed with sustained force toward and permanently joined (soldered, welded or brazed) onto the electrically conductive porous surface; no point within any uncompressed membrane area is permitted to be further from a nearest compressed area than three times the defined thickness dimension of the membrane and wherein; electrical resistance between a location within membrane compressed area, being one of; compressed and permanently joined onto the conducting surface, and the conducting surface must be less than 10 micro-ohm. The latter condition defines the amount of sustained or removable with joining compression force required to produce the defined low resistance. Increasing pressure leads to lower resistance until the specified value obtains.

Mobile electrolyte is configured to prevent discharge or parasitic electrical currents in series connected unit cells for high voltage configuration. In prior art such currents are due to ion kinetic pathways in electrolyte circulation provided by a single pump and circulation loop.

There has been provided an electrode and structure for electrochemical cells using mobile convective electrolyte.

While the electrode and related structure has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

Definition to be Used for Reading Claims

The term, pellicle uses the standard dictionary definition of a membrane having two surfaces separated by a thickness dimension substantially less than its areal dimension, i.e. thin: —skin, film or membrane. The average uncompressed thickness dimension is used here.

A galvanic membrane is defined herein as comprising at least one of; a cohesive carbonaceous mat comprising nanoscale carbon surfaces of at least one of; SWCNT, MWCNT and graphene layers; nanoscale carbon surfaces coated with electrochemically active galvanic material; electrochemically active galvanic particles lodged within the mat; and a solid or porous metal sheet coated on both surfaces by attachment deposition with a layer comprising at least one of; SWCNT, MWCNT and graphene layers. For purposes herein, the word "about" is to mean plus or minus ten percent.

Cohesive shall mean having tensile strength of at least 2 MPa.

What is claimed is:

1. An electrode for an electrochemical cell, the electrode comprising:
   a) a galvanic membrane having a thickness dimension defined by an average length of vectors normal to a membrane first surface and extending to where said vectors intersect a membrane uncompressed second surface;
   b) a first non-porous metal sheet having first and second surfaces, said first non-porous metal sheet electrically coupled to said galvanic membrane proximate said first non-porous metal sheet first surface;
   c) a first square weave metal wire screen adjacent and in contact with said first non-porous metal sheet first surface, said first square weave metal wire screen having a wire diameter not less than one half the galvanic membrane thickness dimension; wherein uniform wire mesh spacing is not greater than 4.25 times the galvanic membrane defined thickness dimension;
   d) a second non-porous metal sheet having first and second surfaces, said second non-porous metal sheet electrically coupled to said galvanic membrane proximate said second non-porous metal sheet first surface;
   e) a second square weave metal wire screen adjacent and in contact with said second non-porous metal sheet first surface, said second square weave metal wire screen having a wire diameter not less than one half the galvanic membrane thickness dimension; wherein uniform wire mesh spacing is not greater than 4.25 times the galvanic membrane defined thickness dimension;
   wherein, the galvanic membrane is between the first square weave metal wire screen on a galvanic membrane first side and the second square weave metal wire screen opposite said first square weave; and wherein each of the first square weave metal wire screen and the second square weave metal wire screen is collectively in incompressible vertical alignment and configured for a mobile electrolyte flow through said first square weave metal wire, said galvanic membrane and said second square weave metal wire.

2. The electrode for an electrochemical cell of claim 1 wherein:
brazing/solder joints are configured at opposed wire screen crossover locations.

3. The electrode for an electrochemical cell of claim 1 wherein:
one of: a sustained compressive force or a braze/solder at wire screen crossover locations produces electrical resistance between the first and second non-porous metal sheets and the first and second square weave metal wire screens adjacent each of the respective first and second non-porous metal sheet of not greater than 1 μ-ohm.

4. The electrode for an electrochemical cell of claim 1 wherein:
electrolyte permeates the galvanic membrane with a convection velocity of at least 1 cm/sec.

5. The electrode for an electrochemical cell of claim 1, wherein neither the first nor the second surfaces of said galvanic membrane is cut or penetrated by compression or braze/solder joints.

6. The electrode for an electrochemical cell of claim 1 wherein:
the plurality of wire crossover locations do not collectively compress more than 10% of a total galvanic membrane area.

7. The electrode for an electrochemical cell of claim 6 wherein:
no point within an uncompressed portion of the galvanic membrane is further from the nearest compressed location than 10 times the thickness dimension of the galvanic membrane.

8. The electrode for a electrochemical cell of claim 1 wherein, the galvanic membrane is cohesive and comprises at least one of: nonwoven single-walled carbon nanotubes; nonwoven multi-walled carbon nanotubes; a single or a plurality of layers of graphene sheets; one of: single-walled and multi-walled carbon nanotubes attached to one or both sides of a metal sheet or woven carbon fiber; and combinations thereof; and wherein the nanoscale surfaces of these structures are one of: coated with galvanic material and adjacent galvanic particles lodged therein and immobilized.

9. The electrode for an electrochemical cell of claim 1, wherein at least 10% of the composition of the galvanic membrane comprises at least one of:
SWCNT, MWCNT and graphene layers;
each of said SWCNT, said MWCNT and said graphene layers having a length dimension greater than the thickness dimension of the galvanic membrane.

10. The electrode for an electrochemical cell of claim 1, wherein galvanic material coatings within the galvanic membrane define at least one of: a cathodic electrochemical redox reaction and an anodic redox electrochemical reaction with respect to one of: electrolyte and the terminals of an electrical circuit.

11. The electrode for an electrochemical cell of claim 1, wherein galvanic materials lodged and immobilized within the galvanic membrane are particles having enveloping spherical diameters in the range between 20 nm and 10 μm and define at least one of: a cathodic electrochemical redox reaction and an anodic redox electrochemical reaction with respect to electrolyte.

* * * * *